United States Patent
Inamochi

(10) Patent No.: US 7,822,673 B2
(45) Date of Patent: Oct. 26, 2010

(54) AUTOMATIC TRANSACTION APPARATUS

(75) Inventor: Kiyoshi Inamochi, Maebashi (JP)

(73) Assignee: Fujitsu Limited, Kawasaki (JP)

( * ) Notice: Subject to any disclaimer, the term of this patent is extended or adjusted under 35 U.S.C. 154(b) by 125 days.

(21) Appl. No.: 11/006,727

(22) Filed: Dec. 8, 2004

(65) Prior Publication Data
US 2005/0119970 A1    Jun. 2, 2005

Related U.S. Application Data

(63) Continuation of application No. PCT/JP02/07104, filed on Jul. 12, 2002.

(51) Int. Cl.
*G06Q 40/00*    (2006.01)
(52) U.S. Cl. .......................... 705/37; 705/39
(58) Field of Classification Search .............. 705/35–45
See application file for complete search history.

(56) References Cited

U.S. PATENT DOCUMENTS

| | | | |
|---|---|---|---|
| 5,880,444 A * | 3/1999 | Shibata et al. ............... 235/379 |
| 6,061,516 A * | 5/2000 | Yoshikawa et al. .......... 717/109 |
| 6,289,320 B1 * | 9/2001 | Drummond et al. .......... 705/35 |
| 6,334,117 B1 * | 12/2001 | Covert et al. ................. 705/43 |
| 6,443,359 B1 * | 9/2002 | Green et al. ................. 235/379 |
| 6,470,326 B1 * | 10/2002 | Drummond et al. .......... 705/43 |
| 6,943,795 B1 * | 9/2005 | Matsui et al. ................ 345/475 |
| 7,077,312 B2 * | 7/2006 | Putman et al. ............... 235/379 |
| 2002/0016772 A1 * | 2/2002 | Shane et al. .................. 705/43 |
| 2002/0026421 A1 * | 2/2002 | Drummond et al. .......... 705/43 |
| 2002/0032656 A1 * | 3/2002 | Chen ........................... 705/43 |
| 2003/0040946 A1 * | 2/2003 | Sprenger et al. .............. 705/6 |
| 2003/0208405 A1 * | 11/2003 | Putman et al. ................ 705/16 |
| 2006/0255121 A1 * | 11/2006 | Putman et al. ............... 235/379 |

FOREIGN PATENT DOCUMENTS

| | | |
|---|---|---|
| JP | 60-212869 | 10/1985 |
| JP | 63-316164 | 12/1988 |
| JP | 2-28872 | 1/1990 |
| JP | 02028872 A * | 1/1990 |
| JP | 41-01291 | 4/1992 |
| JP | 5-6481 | 1/1993 |
| JP | 5-37545 | 2/1993 |
| JP | 6-60101 | 3/1994 |

(Continued)

OTHER PUBLICATIONS

Notification of Reason(s) for Refusal mailed Oct. 18, 2007 in Japanese Application 2004-521104.

(Continued)

*Primary Examiner*—Jason M Borlinghaus
(74) *Attorney, Agent, or Firm*—Staas & Halsey LLP

(57) ABSTRACT

When a transaction such as, for example, a balance inquiry, a cash transaction such as money deposition or money withdrawal, a transfer, a passbook entry, or an inquiry for details of used money amounts or an available money amount is to be performed, additional information at a suitable point of time to improve the operability, reduce the time required for a transaction, and achieve an effective and accurate transaction, an automatic transaction apparatus is provided The apparatus includes a transaction screen displaying section, an additional information screen displaying section, and a control section.

11 Claims, 13 Drawing Sheets

FOREIGN PATENT DOCUMENTS

| | | |
|---|---|---|
| JP | 7-129696 | 5/1995 |
| JP | 7-262291 | 10/1995 |
| JP | 8-87642 | 4/1996 |
| JP | 90-26816 | 1/1997 |
| JP | 09026816 A * | 1/1997 |
| JP | 10-143716 | 5/1998 |
| JP | 11-3203 | 1/1999 |
| JP | 2000-67303 | 3/2000 |
| JP | 2001-34723 | 2/2001 |
| JP | 2001-250152 | 9/2001 |
| JP | 2001-285518 | 10/2001 |
| JP | 2001-357215 | 12/2001 |
| JP | 2002-032826 | 1/2002 |
| WO | WO02/27579 | 4/2002 |

OTHER PUBLICATIONS

Notification of Reason for Refusal issued in JP2004-521104 on Apr. 10, 2007.

Japanese Notification of Reason for Refusal issued in corresponding Japanese Patent Application No. JP2004-521104 (dated Apr. 10, 2007) presents rejections based on reference AG-AK in Form PTO-1449 hereof.

The other cited reference JP8-87642 and JP6-60101 were previously submitted on Applicants Information Disclosure dated Dec. 8, 2004.

Y. Otsuka "Automatic Transaction Device, Automatic Transaction System, Computer-Readable Recording Medium With Transaction Screen Data Renewal Program Recorded on IT, and Transaction Screen Data Renewal Program" Japanese Patent Laid-Open, (Kokai) No. 2002-32826, Jan. 31, 2002, Abstract.

S. Inoue "Commerce System, Commerce Method, and Recorded Medium Where Selling Price Setting Data Structure Is Recorded" International Publication No. WO 02/27579, Apr. 4, 2002, Abstract.

N. Ota "Communication Terminal Equipment, Its Access Point Selection Method, and Communication System Provided With the Equipment" Japanese Patent Laid-Open, (Kokai) No. 2001-285518, Dec. 10, 2001, Abstract.

K. Inamochi "Automatic Transaction Device, Computer-Readable Recording Medium With Transaction Program Recorded, and Transaction Program" Japanese Patent Laid-Open, (Kokai) No. 2001-357215, Dec. 26, 2001, Abstract.

T. Higashiura, et al. "Automatic Transaction System" Japanese Patent Laid-Open (Kokai) No. 2001-250152, Sep. 14, 2001, Abstract.

* cited by examiner

AUTOMATIC TRANSACTION APPARATUS

This application is a continuation application, filed under 35 USC 111(a), of International Application PCT/JP2002/007104, filed Jul. 12, 2002.

TECHNICAL FIELD

The present invention relates to an automatic transaction apparatus (automatic machine) suitable for use with an ATM (Automatic Teller Machine), a CD (Cash Dispenser) and so forth installed, for example, in a bank or the like.

BACKGROUND

Conventionally, an ATM (automatic transaction apparatus) for automatically performing a plurality of transactions such as a balance inquiry, a cash transaction such as money deposition or money withdrawal, a money transfer, a passbook entry and so forth is installed in a store of a bank or the like. Further, a CD (automatic transaction apparatus) for automatically performing a plurality of transactions such as a cash transaction such as a cashing service (loan), an inquiry for details of used money amounts or an available money amount is installed in a store of a finance undertaker or the like.

In such an automatic transaction apparatus such as an ATM and a CD as described above, a user can perform various inputting operations through a display screen which is changed over in order for each phase of a transaction to perform various transactions.

However, in such an automatic transaction apparatus as described above, although a plurality of transactions can be automatically performed individually in accordance with a fixed transaction procedure, the plural transactions cannot be performed in parallel.

For example, even if the user wants to confirm the balance at present while the user performs a cash transaction such as deposition or withdrawal of the money, the user cannot perform balance inquiry in a state wherein the cash transaction remains reserved. Therefore, the user is obliged to end the cash transaction once and return the display screen to a first transaction selection screen to perform the balance inquiry. Then, after the balance inquiry ends, the user is obliged to return the display screen to the first transaction selection screen again to perform the cash transaction. Further, where the user wants to confirm the balance after the cash transaction ends, the user is obliged to return the display screen to the first transaction selection screen again to perform the balance inquiry.

Further, even if the user wants to confirm information of money rates, the date of repayment and so forth while the user performs a loan transaction, the user cannot confirm the information of the money rate, the date of repayment and so forth while the loan transaction is reserved. Therefore, the user is obliged to end the loan transaction once and confirm the information of the money rates, the date of repayment and so forth, and thereafter perform the loan transaction again.

In this manner, in the automatic transaction apparatus, individual transactions cannot be performed in parallel. Therefore, retrying of operation by the user is required frequently and the operation performance is low, and a long period of times is required for a transaction.

Particularly in a complicated transaction such as money transfer, the user must stepwise perform inputting operation of a transfer destination, an account number, an account name, a transfer amount of money and so forth through a plurality of display screens changed over successively. Therefore, it is demanded to eliminate the necessity to retry an inputting operation when the user wants to perform some other transaction such as a balance inquiry halfway thereby to improve the operation performance and reduce the transaction time.

In this instance, it is a possible idea to make it possible to perform a different transaction through an interruption process while an individual transaction is performed. However, this gives rise to increase in design variation for the existing system and complicate the process, which is not preferable. Further, taking the operation performance of the user into consideration, it is preferable that a normal transaction is performed in accordance with a series of procedures as usual.

Further, while transactions which can be performed by the automatic transaction apparatus are fixed, much information is required when the user performs a transaction. Therefore, it is expected that the automatic transaction apparatus is configured so as to acquire information to be utilized as reference information upon transaction through the automatic transaction apparatus.

In this manner, if the automatic transaction apparatus is configured so that the user can acquire reference information upon transaction through the automatic transaction apparatus, then a feeling of reliability can be given to the user and an accurate and rapid transaction can be implemented.

Incidentally, the conventional automatic transaction apparatus merely provides fixed information regardless of a phase of a transaction during waiting (customer waiting) or during communication with a host computer.

However, if information is timely provided to the user for each phase of a transaction by the automatic transaction apparatus, then a feeling of reliability can be given to the user. Further, timely provision of information is important also for implementation of an accurate and rapid transaction.

DISCLOSURE OF THE INVENTION

The present invention has been made in view of such subjects as described above, and it is an object of the present invention to provide an automatic transaction apparatus, a screen displaying method for the automatic transaction apparatus, a screen display processing program and a computer-readable recording medium having the screen display processing program stored therein by which information (reference information) to be referred to when a transaction such as, for example, a balance inquiry, a cash transaction such as money deposition or money withdrawal, a transfer, a passbook entry, or an inquiry for details of used money amounts or an available money amount is to be performed can be provided at a suitable point of time to improve the operability, reduce the time required for a transaction and achieve an effective and accurate transaction.

In order to attain the object described above, according to the present invention, there is provided an automatic transaction apparatus comprising a normal transaction screen displaying section for displaying a plurality of normal transaction screens used for normal transactions in order in accordance with an operation of a user, an additional information screen displaying section for displaying additional information when the user operates the normal transaction screen displaying section to perform a normal transaction, and a control section for performing control for causing the normal transaction screen displaying section to display any of the normal transaction screens and causing the additional information screen displaying section to display additional information corresponding to the normal transaction screen to be displayed on the normal transaction screen displaying section.

Preferably, the control section includes a normal transaction controlling section, with communicating with a host computer through a first communication line in response to the operation of the user, for performing control for reading out one of the normal transaction screens stored in advance in a storage section and changing over the normal transaction screen to be displayed on the normal transaction screen displaying section, and an additional information controlling section for performing control for acquiring additional information, through a second communication line different from the first communication line, corresponding to the screen to be displayed on the normal transaction screen displaying section and changing over the additional information to be displayed on the additional information screen displaying section.

Particularly where the normal transaction controlling section causes the normal transaction screen displaying section to display a screen for urging the user to insert a card, preferably the additional information controlling section acquires information regarding usable cards through the second communication line and causes the additional information screen displaying section to display the acquired information.

Further preferably, where the normal transaction controlling section causes the normal transaction screen displaying section to display a screen for urging the user to input a password, the additional information controlling section acquires a password search screen through the second communication line and causes the additional information screen displaying section to display the acquired password search screen.

Further preferably, where a password corresponding to a keyword inputted through the password search screen displayed on the additional information screen displaying section is searched out, the additional information controlling section acquires the password through the second communication line and causes the additional information screen displaying section to display the acquired password.

Preferably, where the normal transaction controlling section causes the normal transaction screen displaying section to display a screen for urging the user to input an amount of money, the additional information controlling section acquires information necessary for determination of an amount of money through the second communication line and causes the additional information screen displaying section to display the acquired information.

Further preferably, where an instruction for acquiring any information from among balance information, transfer history information and paying out history information is inputted as information necessary for determination of an amount of money through the additional information screen displaying section, the additional information controlling section communicates with the host computer through the second communication line to acquire any information from among balance information, transfer history information and paying out history information based on identification information of the user, and causes the additional information screen displaying section to display the acquired information.

Preferably, where an input miss of an amount of money occurs, the normal transaction controlling section causes the normal transaction screen displaying section to display a screen, stored in advance in the storage section, for urging the user to input an amount of money again, and the additional information controlling section acquires information including a paying out limit amount of money through the second communication line and causes the additional information screen displaying section to display the acquired information.

Preferably, where the additional information controlling section receives a response that additional information cannot be acquired through the second communication line, the additional information controlling section causes the additional information screen displaying section to display fixed information stored in advance in the storage section.

Preferably, when the additional information controlling section tries to acquire additional information through the second communication line, the additional information controlling section decides a line speed of the second communication line, and where the additional information controlling section decides that the line speed of the second communication line is lower than or equal to a predetermined speed, the additional information controlling section causes the additional information screen displaying section to temporarily display fixed information stored in advance in the storage section, and then, after the additional information is acquired through the second communication line, the additional information controlling section causes the additional information screen displaying section to display the acquired additional information in place of the fixed information.

Further preferably, where the additional information controlling section decides that the line speed of the second communication line is not lower than or equal to the predetermined speed, the additional information controlling section immediately starts acquisition of additional information through the second communication line and causes the additional information screen displaying section to display the acquired additional information.

According to the present invention, there is provided an automatic transaction apparatus which includes a screen displaying section for displaying a normal transaction screen used in a normal transaction process and communicates with a host computer in response to an operation of a user to perform a normal transaction process, comprising an information terminal section for acquiring information through the Internet and displaying the acquired information.

Particularly preferably, the information terminal section can be used in parallel during normal transaction operation to acquire information.

Preferably, the information terminal section can be used to perform a home banking transaction.

According to the present invention, there is provided a screen displaying method for an automatic transaction apparatus which performs a transaction process in response to an operation of a user, comprising a normal transaction screen displaying step of reading out a normal transaction screen, stored in advance in a storage section, for using a normal transaction and causing a screen displaying section to display the read out screen, and an additional information displaying step of acquiring additional information corresponding to the normal transaction screen to be displayed on the screen displaying section through a network and displaying the acquired information on the screen displaying section.

According to the present invention, there is provided a screen display processing program for using screen displaying of an automatic transaction apparatus which performs a transaction process in response to an operation of a user, the screen display processing program causing a computer to execute a process comprising a step of acquiring additional information corresponding to a normal transaction screen to be displayed on a screen displaying section through a network, and a step of causing the screen displaying section to display the acquired additional information.

According to the present invention, there is provided a computer-readable recording medium which stores a screen display processing program for using screen displaying of an automatic transaction apparatus which performs a transaction process in response to an operation of a user, the screen display processing program causing a computer to execute a process comprising a step of acquiring additional information corresponding to a normal transaction screen to be displayed on a screen displaying section through a network, and a step of causing the screen displaying section to display the acquired additional information.

BEST MODE FOR CARRYING OUT THE INVENTION

In the following, an automatic transaction apparatus, a screen displaying method for the automatic transaction apparatus, a screen display processing program and a computer-readable recording medium on which the screen display processing program is stored according to an embodiment of the present invention are described.

First Embodiment

First, the automatic transaction apparatus and the screen displaying method for the automatic transaction apparatus according to the first embodiment of the present invention are described with reference to FIGS. 1 to 12.

[Description of the Automatic Transaction Apparatus]

First, an automatic transaction system including the automatic transaction apparatus according to the present embodiment is described with reference to FIG. 1.

Figure 1:
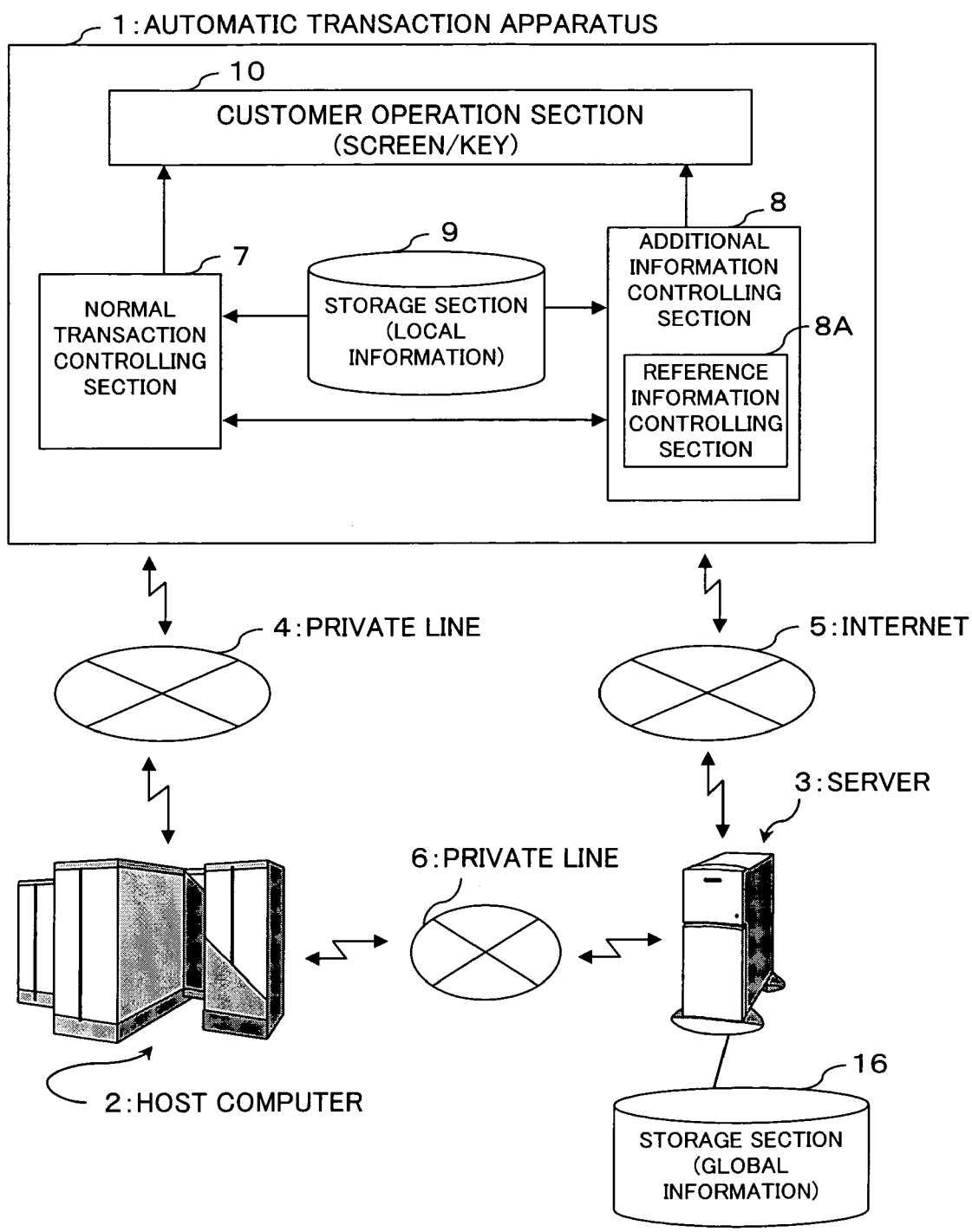
FIG. 1 is a view showing a general configuration of an automatic transaction system including an automatic transaction apparatus according to a first embodiment of the present invention.

As shown in FIG. 1, the automatic transaction system includes an automatic transaction apparatus (automatic apparatus) 1 such as, for example, an ATM or a CD, a host computer (mainframe) 2 for managing customer information such as account information, and a server (WWW server) 3.

The automatic transaction apparatus 1 and the host computer 2 are connected to each other, for example, through a private line (or a public line; network, first communication line) 4. When a user (customer) operates the automatic transaction apparatus 1 in order to perform a normal transaction, communication is performed between the automatic transaction apparatus 1 and the host computer 2 and a normal transaction process is executed by the automatic transaction apparatus 1.

Further, the automatic transaction apparatus 1 and the server 3 are connected to each other, for example, through the Internet (network, second communication line) 5. When an additional information acquiring process (reference information acquiring process) is executed by the automatic transaction apparatus 1, communication is performed between the automatic transaction apparatus 1 and the server 3 through the Internet 5.

Consequently, the user who operates the automatic transaction apparatus 1 to perform the normal transaction can acquire information (reference information; information effective upon the normal transaction, information regarding the transaction) which can be used as reference when the normal transaction is performed and information (additional information) additional for the normal transaction such as advertisement information.

The host computer 2 and the server 3 are connected to each other, for example, through a private line (or a public line; network, third communication line) 6. When the additional information acquiring process (reference information acquiring process) is executed by the automatic transaction apparatus 1, communication is performed between the server 3 and the host computer 2 through the private line (or the public line) 6.

Consequently, where the server 3 receives a transmission request for reference information (for example, balance information or the like), which can be used as reference when the transaction is performed, from the automatic transaction apparatus 1, the pertaining reference information can be acquired from the host computer 2, for example, through the private line 6. It is to be noted that the host computer 2 and the server 3 may be connected to each other otherwise by a LAN (Local Area Network).

In this manner, the automatic transaction apparatus 1 and the host computer 2, the automatic transaction apparatus 1 and the server 3, and the server 3 and the host computer 2, are individually connected to each other by independence lines (networks).

Here, a hardware configuration of the automatic transaction apparatus 1 is described.

The automatic transaction apparatus 1 includes a CPU (control section) for executing a predetermined program to control various hardware, a ROM (storage section) for storing a boot program and so forth, a RAM (storage section) used as a working area and so forth, a hard disk (HD, storage section) for storing a particular program and various information (for example, advertisement information and so forth), a hard disk drive (HDD), a CD-ROM drive, a card reader for reading data from a card such as, for example, a cash card of a bank, a cash processing section for performing a cash process such as acceptance and dispensing of cash, a receipt printer for printing a receipt, a customer operation section such as, for example, a keyboard, a display unit (display screen) and so forth, a voice outputting section for outputting voice, a host computer interface used for connection to the host computer 2, a server interface (interface for the Internet) used for connecting to the server 3, and so forth.

In the following, the automatic transaction apparatus 1 having such a hardware configuration as described above is described with reference to a functional block diagram in FIG. 1.

As shown in FIG. 1, the automatic transaction apparatus 1 includes a normal transaction controlling section (controlling section) 7 for controlling, upon a normal transaction, such various hardware elements as described above which form the automatic transaction apparatus 1, a storage section 9 for storing various information (local information) such as, for example, a program and an advertisement, and a customer operation section (screen/key) 10 for being operated when the user performs a normal transaction or acquires additional information (reference information).

Figure 2:
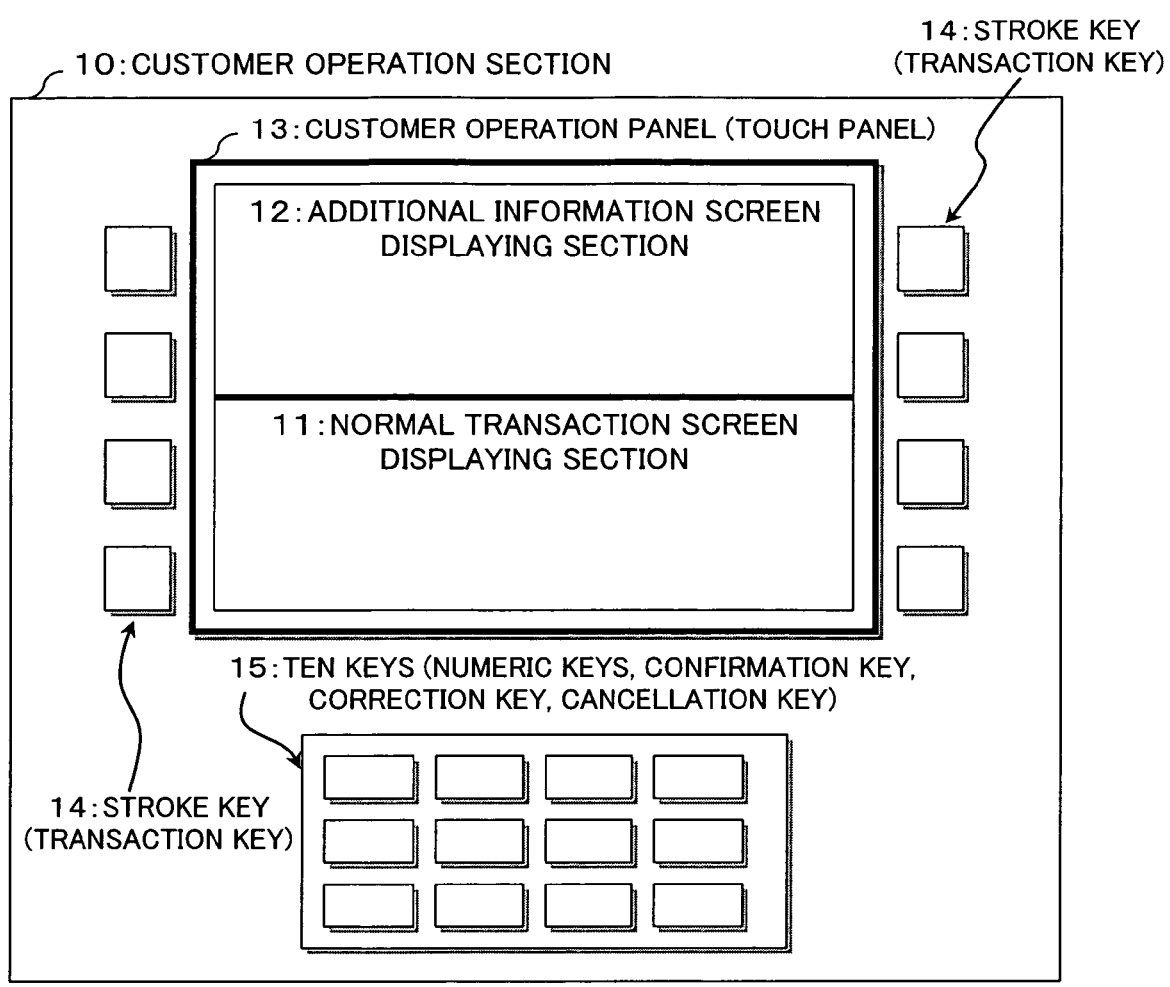
FIG. 2 is a schematic view showing a customer operation section of the automatic transaction apparatus according to the first embodiment of the present invention.

As shown in FIG. 2, the customer operation section 10 includes a customer operation panel (touch panel) 13 including two screen displaying sections of a normal transaction screen displaying section (first screen displaying section) 11 and an additional information screen displaying section (reference information screen displaying section, second screen displaying section) 12, stroke keys (transaction keys) 14, and ten keys (numeric keys, confirmation key, correction key, cancellation key and so forth) 15.

It is to be noted that the configuration of the customer operation panel 13 is not limited to this. Further, while it is described here that the customer operation panel 13 includes two screen displaying sections, also it is possible to consider that one screen displaying section is divided into two sections.

As shown in FIG. 1, the normal transaction controlling section 7 performs control for changing over a normal transaction screen displayed on the normal transaction screen displaying section 11 in accordance with each process when the normal transaction process is executed. In particular, the screen displayed on the normal transaction screen displaying section 11 is controlled by the normal transaction controlling section 7.

More particularly, as shown in FIG. 1, the normal transaction controlling section 7 accesses the storage section (for example, hard disk or the like) 9 of the automatic transaction apparatus 1 to read out information (normal transaction screen information; local information) stored in the storage section 9 to be used for a normal transaction and causes the normal transaction screen displaying section 11 to display the read out information.

Further, as shown in FIG. 1, the normal transaction controlling section 7 has also a function of communicating with the host computer 2, for example, through the private line (or the public line) 4 to acquire information (customer information such as, for example, balance information) stored in the storage section of the host computer 2 and causing the normal transaction screen displaying section 11 to display the acquired information. For example, the normal transaction controlling section 7 incorporates acquired information (for example, balance information and so forth) into screen information stored in the storage section 9 and causes the normal transaction screen displaying section 11 to display the resulting information.

It is to be noted that, in order to communicate with the host computer 2, the normal transaction controlling section 7 has also a function of transmitting information (for example, information such as a personal identification number and an amount of money) inputted, upon a normal transaction, through the normal transaction screen displaying section 11 by the user to the host computer 2 through the private line (or public line) 4 and a function of receiving information (for example, transaction permission information and so forth) transmitted from the host computer 2.

Further, in the present embodiment, as shown in FIG. 1, the automatic transaction apparatus 1 includes an additional information controlling section (controlling section) 8 for acquiring additional information such as reference information or advertisement information from the server 3 and performing control for changing over additional information (additional information screen) to be displayed on the additional information screen displaying section 12. Particularly, a function of acquiring reference information from the server 3 and performing control for changing over reference information (reference information screen) to be displayed on the reference information screen displaying section 12 is hereinafter referred to as a reference information controlling section 8A.

As shown in FIG. 1, the additional information controlling section 8 performs a process for causing the additional information screen displaying section 12 to display, when an additional information acquiring process is performed, a screen (mainly, a screen different from a screen used for a normal transaction) corresponding to each process.

In particular, the screen to be displayed on the additional information screen displaying section 12 is controlled by the additional information controlling section 8. Here, the screen to be displayed on the additional information screen displaying section 12 is controlled by the additional information controlling section 8 independently of a screen which is displayed on the normal transaction screen displaying section 11 and controlled by the normal transaction controlling section 7.

In the present embodiment, the additional information controlling section 8 has a function of communicating with the server 3 through the Internet 5 to acquire various information stored in the storage section 16 of the server 3 and including customer information such as, for example, balance information, reference information such as information (for example, information regarding a paying out limit amount and so forth)

corresponding to environment of the automatic transaction apparatus 1, and additional information (global information) such as advertisement information and causing the additional information screen displaying section 12 to display the acquired information.

Meanwhile, where a transmission request for reference information such as information (for example, information regarding a paying out limit amount of money and so forth) corresponding to the environment of the automatic transaction apparatus 1 is received from the additional information controlling section 8, the server 3 reads out the screen information including the reference information (global information) stored in the storage section 16 and transmits the read out screen information including the reference information to the additional information controlling section 8 through the Internet 5.

Further, where a transmission request for reference information such as, for example, balance information is received from the additional information controlling section 8, the server 3 communicates with the host computer 2, for example, through the private line (or public line) 6 to acquire information such as, for example, the balance information from the host computer 2, for example, through the private line (or public line) 6. Then, the server 3 incorporates the acquired information into the screen information stored in advance in the storage section 16 and transmits the resulting information as screen information including the reference information to the additional information controlling section 8 through the Internet 5.

Further, the additional information controlling section 8 has also a function of accessing the storage section (for example, hard disk or the like) 9 of the automatic transaction apparatus 1 to read out the additional information (local information) such as, for example, advertisement information stored in the storage section 9 and causes the additional information screen displaying section 12 to display the readout information. This function is used mainly for a case wherein the additional information controlling section 8 cannot access the server 3 through the Internet 5 upon information acquisition, and so forth.

As described above, the additional information controlling section 8 can access the server 3 through the Internet 5 to acquire information stored in the storage section 16 of the server 3. Therefore, for example, in a case wherein the user wants to periodically exchange local information stored in the storage section 9 of the automatic transaction apparatus 1 or the like, the function described above may be utilized to acquire new local information and update the local information stored in the storage section 9 of the automatic transaction apparatus 1 with the acquired new local information.

It is to be noted that, while the additional information controlling section 8 in the present embodiment basically accesses the server 3 through the Internet 5 to acquire information (global information) stored in the storage section 16 of the server 3 and causes the additional information screen displaying section 12 to display the acquired information, the acquiring and displaying process is not limited to this. For example, fixed information (screen information) may be acquired and displayed in the following manner. In particular, the fixed information is stored in advance in the storage section 9 of the automatic transaction apparatus 1, and the additional information controlling section 8 accesses the storage section 9 of the automatic transaction apparatus 1 to acquire the information without accessing the server 3 through the Internet 5 and causes the additional information screen displaying section 12 to display the acquired information.

Incidentally, in the present embodiment, when each of the normal transaction screen displaying section 11 and the additional information screen displaying section 12 is caused to display a screen, the normal transaction controlling section 7 or the additional information controlling section 8 refers to a screen definition table for each process stored in the storage section 9 and accesses local information stored in the storage section 9 of the automatic transaction apparatus 1 or global information stored in the storage section 16 of the server 3.

Figure 3:
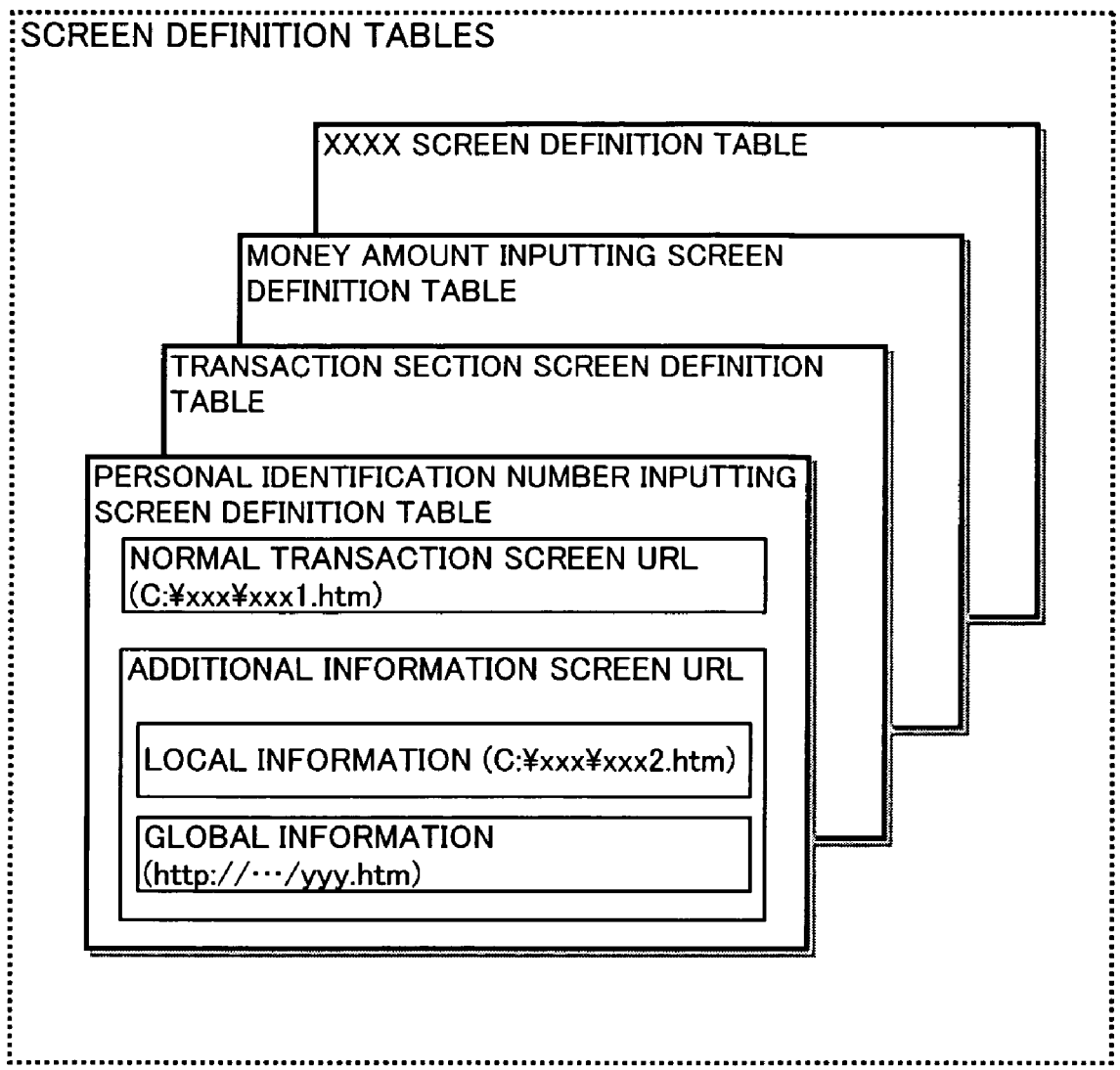
FIG. 3 is a view illustrating a screen definition table used by the automatic transaction apparatus according to the first embodiment of the present invention.

Therefore, as shown in FIG. 3, a plurality of screen definition tables corresponding to different processes such as a personal identification number inputting process, a transaction selection process and a money amount inputting process are stored in the storage section 9 of the automatic transaction apparatus 1. For example, in a screen definition table file, a plurality of screen definition tables such as a waiting screen definition table, a personal identification number inputting screen definition table, a transaction selection screen definition table, a money amount inputting screen definition table, a confirmation inputting screen definition table, a host communication screen definition table, and a transaction continuation screen definition table are stored.

For example, as shown in FIG. 3, a screen definition table of a screen to be displayed upon a personal identification number inputting process has stored therein a normal transaction screen address [normal transaction screen URL (Uniform Resource Locator)] for accessing data of a screen (normal transaction screen) to be displayed on the normal transaction screen displaying section 11 and an additional information screen address [additional information screen URL (Uniform Resource Locator); reference information screen address] for accessing data of a screen (additional information screen, reference information screen) to be displayed on the additional information screen displaying section (reference information screen displaying section) 12.

In the present embodiment, as the normal transaction screen address, an address (C:¥xxx¥xxx1.htm) for accessing data (local information) stored in the storage section 9 of the automatic transaction apparatus 1 is stored.

Further, as the additional information screen address, a local information address (for example, C¥xxx¥xxx2.htm) for accessing data (local information) stored in the storage section 9 of the automatic transaction apparatus 1 is stored, and also a global information address (for example, http:// . . . ) for accessing data (global information) stored in the storage section 16 of the server 3 is stored.

It is to be noted that the global information address need not be an address for accessing a specific server but can be set arbitrarily. Further, while addresses for accessing both of global information and local information are stored, both of the addresses need not be stored, but an address for accessing either one of the global information and local information may be stored.

However, if the addresses for accessing both of the global information and local information are stored as described above, then in such a case that accessing to the global information is obstructed, for example, by a communication fault or the like, it is possible for the automatic transaction apparatus 1 to access the local information and display a screen on the additional information screen displaying section 12. Therefore, such a situation that nothing is displayed at all on the additional information screen displaying section 12 can be prevented.

[Description of a Screen Displaying Method in the Automatic Transaction Apparatus]

Figure 4:
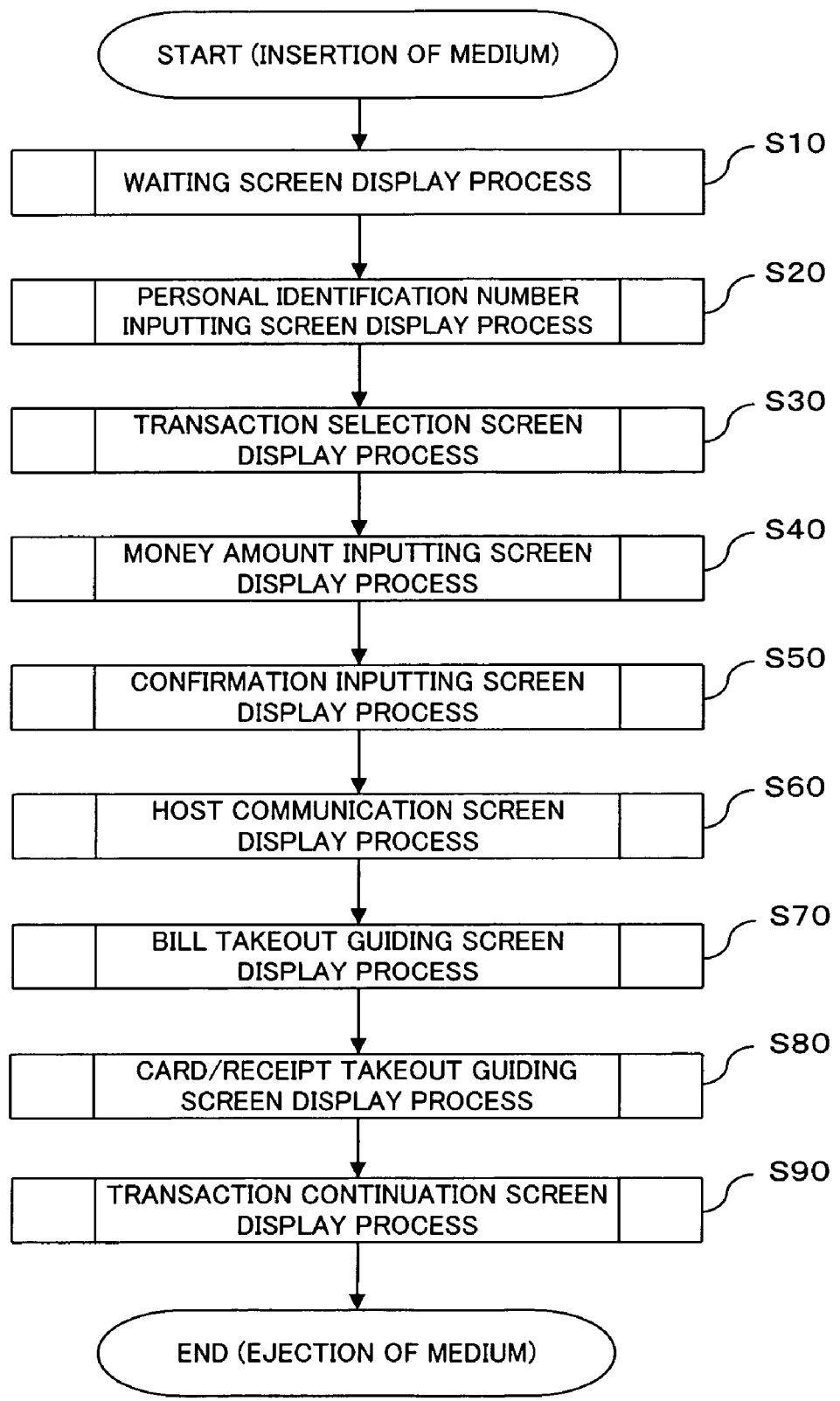
FIG. 4 is a flow chart illustrating a procedure of processes executed by the automatic transaction apparatus according to the first embodiment of the present invention.

Now, a screen displaying process executed upon a normal transaction by the automatic transaction apparatus 1 according to the present embodiment is described with reference to a flow chart of FIG. 4.

First, the normal transaction controlling section 7 refers to the waiting screen definition table stored in the storage section (for example, hard disk) 9 of the automatic transaction apparatus 1 to read out, based on the normal transaction screen address of the waiting screen definition table, data (local information) of a screen (waiting screen; refer to a lower side screen at step A10 in FIG. 5) for urging the user to insert a card from the storage section 9 of the automatic transaction apparatus 1, and causes the normal transaction screen displaying section 11 to display the read out data (step S10; waiting screen display processing step). It is to be noted that, prior to such a screen displaying process as just described, processes such as validation of keys, initialization of data and so forth are performed as preparatory processes.

When such a displaying process of the waiting screen on the normal transaction screen displaying section 11 by the normal transaction controlling section 7 as described above is performed, the additional information controlling section 8 refers, in an interlocking relationship with the displaying process, to the waiting screen definition table stored in the storage section (for example, hard disk) 9 of the automatic transaction apparatus 1 to access the server 3 based on the global information address included in the additional information screen addresses (reference information screen addresses) of the waiting screen definition table.

Figure 5:
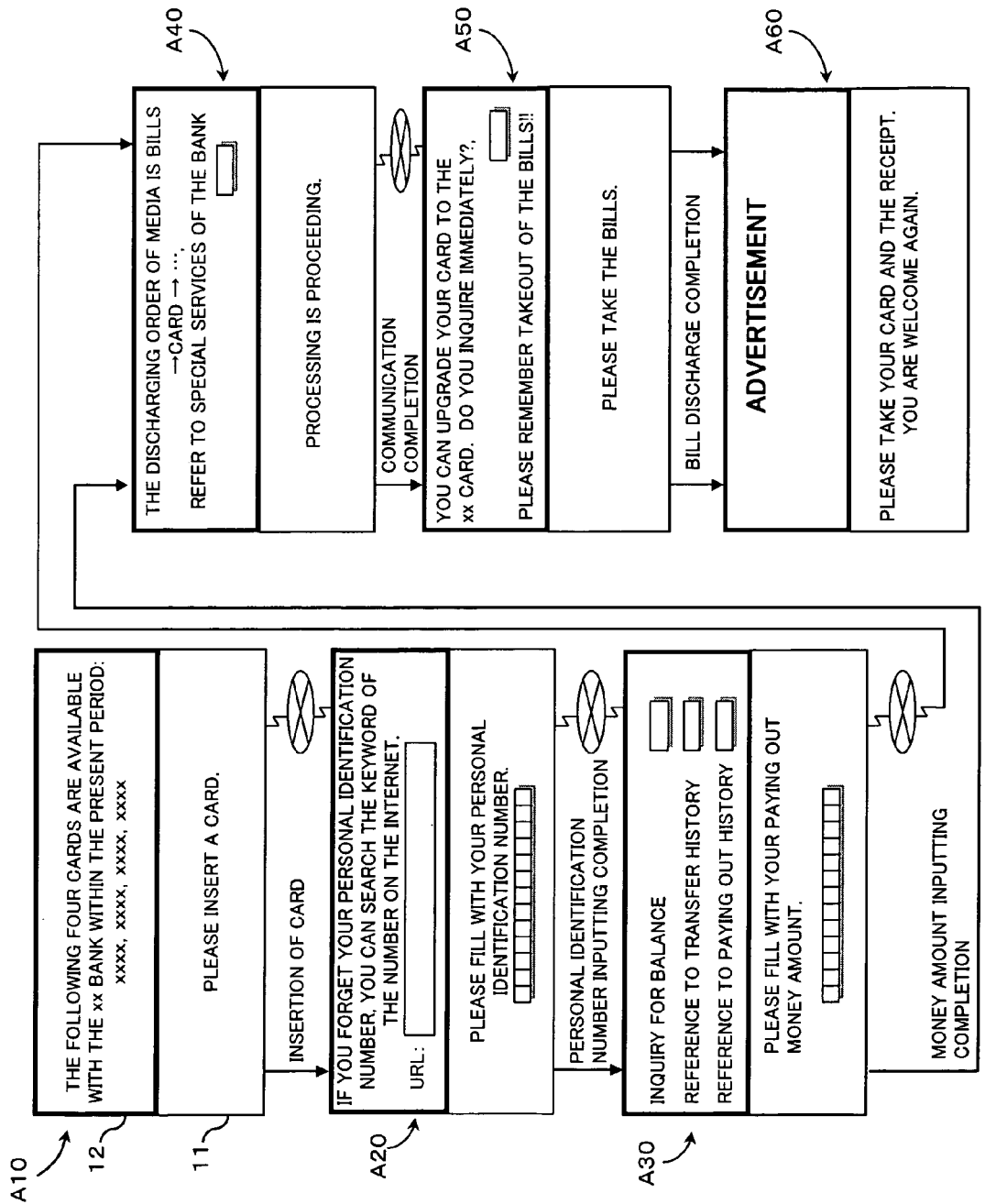
FIG. 5 is a flowchart illustrating screens displayed in individual processes executed by the automatic transaction apparatus according to the first embodiment of the present invention.

Then, the additional information controlling section 8 requests the server 3 for transmission of reference information (card insertion reference information screen) to be referred to upon insertion of a card, and causes the additional information screen displaying section (reference information screen displaying section) 12 to display the reference information (for example, a usable card information screen including information regarding a usable card or a transaction; refer to an upper side screen at step A10 in FIG. 5) transmitted from the server 3 [step S10; waiting screen-corresponding additional information screen (reference information screen) displaying step].

Then, if a card is inserted, then the normal transaction controlling section 7 refers to the personal identification number inputting screen definition table (refer to FIG. 3) stored in the storage section (for example, hard disk) 9 of the automatic transaction apparatus 1 to read out, based on the normal transaction screen address of the personal identification number inputting screen definition table, data (local information) of a screen (personal identification number inputting screen; refer to a lower side screen of step A20 in FIG. 5) for urging the user to input the personal identification number from the storage section 9 of the automatic transaction apparatus 1 and causes the normal transaction screen displaying section 11 to display the read out data (step S20; personal identification number inputting screen display processing step). It is to be noted that, prior to such a screen displaying process as just described, processes such as validation of keys, initialization of data and so forth are performed as preparatory processes.

When such a displaying process of the personal identification number inputting screen on the normal transaction screen displaying section 11 by the normal transaction controlling section 7 as described above is performed, the additional information controlling section 8 refers, in an interlocking relationship with the displaying process, to the personal identification number inputting screen definition table (refer to FIG. 3) stored in the storage section (for example, hard disk) 9 of the automatic transaction apparatus 1 to access the server 3 based on the global information address included in the additional information screen addresses (reference information screen addresses) of the personal identification number inputting screen definition table.

Then, the additional information controlling section 8 requests the server 3 for transmission of a reference information acquiring access screen (here, a keyword searching screen access screen; refer to an upper side screen at step A20 in FIG. 5; information necessary for searching a personal identification number) for accessing reference information (personal identification number inputting reference information screen; personal identification number displaying screen; personal identification number information) to be referred to when the user inputs a personal identification number, and causes the additional information screen displaying section (reference information screen displaying section) 12 to display the reference information acquiring access screen transmitted from the server 3 [step S20; personal identification number inputting screen-corresponding additional information screen (reference information screen) displaying step].

Figure 7:
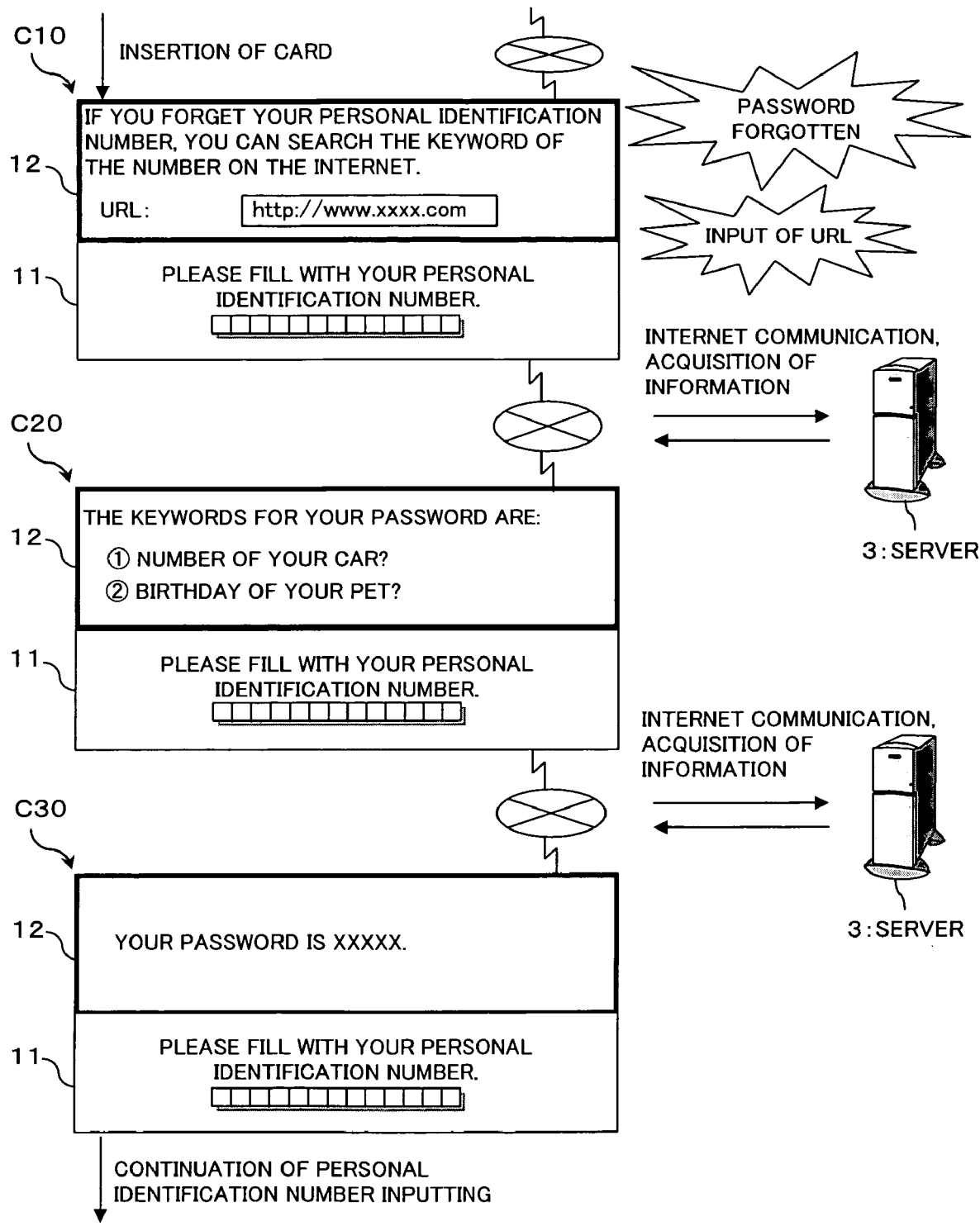
FIG. 7 is a flowchart illustrating a process executed, where the user has forgotten a password, by the automatic transaction apparatus according to the first embodiment of the present invention.

As shown on the upper side screen at step A20 in FIG. 5, the keyword searching screen access screen includes an area for inputting a URL (address) of a personal identification number searching screen (keyword searching screen; refer to an upper side screen at step C20 in FIG. 7) for searching a personal identification number on the Internet. It is to be noted that a process performed by the additional information controlling section 8 where the user inputs a URL to the keyword searching screen access screen displayed on the additional information screen displaying section 12 is hereinafter described.

It is to be noted that, while the keyword searching screen access screen here is configured as a screen including an area for inputting a URL of the personal identification number searching screen (personal identification number and keyword searching site), the access screen is not limited to this. The keyword searching screen access screen may otherwise be configured as a screen including link information (for example, link button and so forth) for accessing the personal identification number searching screen.

Then, if the user inputs a personal identification number through the personal identification number inputting screen displayed on the normal transaction screen displaying section 11 at the step A20 in FIG. 5 (personal identification number input completion), then the normal transaction controlling section 7 transmits the inputted personal identification number to the host computer 2 through the private line (or public line) 4. Then, the host computer 2 performs an authentication process based on the personal identification number transmitted from the automatic transaction apparatus 1. Thereafter, when the authentication process is completed, a notification of the completion of the process is issued from the host computer 2 to the automatic transaction apparatus 1.

When the notification of the completion of the authentication process is issued from the host computer 2, the normal transaction controlling section 7 refers to the transaction selection screen definition table stored in the storage section (for example, hard disk) 9 of the automatic transaction apparatus 1 to read out data (local information) of a transaction selection screen for a normal transaction (not shown) for urging the user to select a transaction such as, for example, a balance inquiry, money transfer, withdrawal (paying out), payment and so forth from the storage section 9 of the automatic transaction apparatus 1 and causes the normal transaction screen displaying section 11 to display the read out data (step S30; transaction selection screen display processing step). It is to be noted that, prior to such a screen displaying process as just described, processes such as validation of keys, initialization of data and so forth are performed as preparatory processes.

When such a displaying process of the transaction selection screen for a normal transaction on the normal transaction screen displaying section 11 by the normal transaction controlling section 7 as described above is performed, the additional information controlling section 8 refers, in an interlocking relationship with the displaying process, to the transaction selection screen definition table stored in the storage section (for example, hard disk) 9 of the automatic transaction apparatus 1 to access the server 3 based on the global information address included in the additional information screen addresses (reference information screen addresses) of the transaction selection screen definition table.

Then, the additional information controlling section 8 requests the server 3 for transmission of information (transaction selection reference information screen) to be referred to when the user selects a transaction, and causes the additional information screen displaying section (reference information screen displaying section) 12 to display the reference information transmitted from the server 3 [step S30; transaction selection screen-corresponding additional information screen (reference information screen) displaying step].

If the user selects a desired transaction through the transaction selection screen displayed on the normal transaction selection displaying section 11 in this manner, then a process corresponding to the selected transaction is executed.

Now, a case wherein the user selects a paying out transaction is described.

In this instance, the normal transaction controlling section 7 refers to the money amount inputting screen definition table stored in the storage section (for example, hard disk) 9 of the automatic transaction apparatus 1 to read out, based on the normal transaction screen address of the money amount inputting screen definition table, data (local information) of a screen [paying out money amount inputting screen; refer to a lower side screen at step A30 in FIG. 5] for urging the user to input a paying out money amount from the storage section 9 of the automatic transaction apparatus 1, and causes the normal transaction screen displaying section 11 to display the read out data [step S40; paying out (withdrawal) money amount inputting screen display processing step]. It is to be noted that, prior to such a screen displaying process as just described, processes such as validation of keys, initialization of data and so forth are performed as preparatory processes.

When such a displaying process of the paying out money amount inputting screen on the normal transaction screen displaying section 11 by the normal transaction controlling section 7 as described above is performed, the additional information controlling section 8 refers, in an interlocking relationship with the displaying process, to the money amount inputting screen definition table stored in the storage section (for example, hard disk) 9 of the automatic transaction apparatus 1 to access the server 3 based on the global information address included in the additional information screen addresses (reference information screen addresses) of the money amount inputting screen definition table.

Then, the additional information controlling section 8 requests the server 3 for transmission of the reference information transaction selection screen (reference information acquisition accessing screen; refer to an upper side screen at step A30 in FIG. 5) for accessing information (paying out money amount inputting reference information screen; information necessary for determination of a money amount) to be referred to for determination of a money amount when the user inputs a paying out money amount, and causes the additional information screen displaying section (reference information screen displaying section) 12 to display the reference information acquisition accessing screen transmitted from the server 3 [step S40; paying out (withdrawal) money amount inputting screen-corresponding additional information screen (reference information screen) displaying step].

As shown on the upper side screen at step A30 in FIG. 5, the reference information transaction selection screen (additional information transaction selection screen) includes link information (link button) for accessing reference information (paying out money amount inputting reference information screen) such as, for example, balance inquiry information, transfer history information, paying out history (withdrawal history) information and so forth.

It is to be noted that a process performed by the additional information controlling section 8 where the user selects a desired transaction through the reference information transaction selection screen displayed on the additional information screen displaying section 12 (where the user clicks some link button) is hereinafter described.

Then, if the user inputs a paying out money amount through the reference information transaction selection screen displayed on the additional information screen displaying section 12 (paying out money amount inputting completion), the normal transaction controlling section 7 refers to a confirmation inputting screen definition table stored in the storage section (for example, hard disk) 9 of the automatic transaction apparatus 1 to read out, based on the normal transaction screen address of the confirmation inputting screen definition table, data (local information) of a confirmation inputting screen (not shown) for urging the user to confirm the paying out money amount from the storage section 9 of the automatic transaction apparatus 1, and causes the normal transaction screen displaying section 11 to display the read out data (step S50; confirmation inputting screen display processing step). It is to be noted that, prior to such a screen displaying process as just described, processes such as validation of keys, initialization of data and so forth are performed as preparatory processes.

It is to be noted that the confirmation inputting screen may be displayed not only at this stage but also at any stage (stage necessary for displaying a screen for urging the user to confirm) such as, for example, a stage after a personal identification number is inputted.

In this instance, as a screen to be displayed on the additional information screen displaying section 12 by the additional information controlling section 8, the screen displayed at the paying out (withdrawal) money amount inputting screen-corresponding additional information screen (reference information screen) displaying step described hereinabove is used (step S50; confirmation inputting screen-corresponding additional information screen (reference information screen) displaying step).

Then, if the user performs confirmation inputting through the confirmation inputting screen displayed on the normal transaction screen displaying section 11 (confirmation inputting completion), then the normal transaction controlling section 7 refers to the host communication (or counting) screen definition table stored in the storage section (for example, hard disk) 9 of the automatic transaction apparatus 1 to read out, based on the normal transaction screen address of the host communication screen definition table, data (local information) of a host communication screen (refer to a lower side screen at step A40 in FIG. 5) which indicates a state wherein the host is communicating (or counting), and causes the normal transaction screen displaying section 11 to display the read out data (step S60; host communication screen display processing step). It is to be noted that, prior to such a screen displaying process as just described, processes such as validation of keys, initialization of data and so forth are performed as preparatory processes.

When such a displaying process of the host communication screen on the normal transaction screen displaying section 11 by the normal transaction controlling section 7 as described above is performed, the additional information controlling section 8 refers, in an interlocking relationship with the displaying process, to the host communication screen definition table stored in the storage section (for example, hard disk) 9 of the automatic traction apparatus 1 to access the server 3 based on the global information address from between the additional information screen addresses (reference information screen addresses) of the host communication screen definition table.

Then, the additional information controlling section 8 requests the server 3 for transmission of information (reference information screen upon process waiting) to be referred to by the user who waits ending of the process, and causes the additional information screen displaying section (reference information screen displaying section) 12 to display the reference information [for example, a medium ejection order guiding screen; refer to an upper side screen at step A40 in FIG. 5] transmitted from the server 3 [step S60; host communication screen-corresponding additional information screen (reference information screen) displaying step].

Here, the medium ejection order guiding screen includes a portion (portion for guiding an operation for a process expected next) for guiding an ejection order of a medium and link information (link button) for accessing information regarding a special service.

It is to be noted that, where the user clicks the link button through the medium ejection order guiding screen displayed on the additional information screen displaying section 12 in order to refer to information regarding a special service, the additional information controlling section 8 requests the server 3 for transmission of the information regarding the special service, and then, if the requested information is transmitted from the server 3, then the additional information controlling section 8 causes the additional information screen displaying section 12 to display the transmitted information.

While the screen display is performed in such a manner as described above, if the user performs inputting of confirmation through the confirmation inputting screen displayed on the normal transaction screen displaying section 11 (confirmation inputting completion), then the normal transaction controlling section 7 executes a process for transmitting an inputted paying out money amount to the host computer 2 through the private line (or public line) 4. Then, the host computer 2 performs a process necessary for paying out based on the paying out money amount transmitted from the automatic transaction apparatus 1. Thereafter, if the process necessary for paying out is completed, then a notification of the completion of the process is issued from the host computer 2 to the automatic transaction apparatus 1.

Thereafter, when the automatic transaction apparatus 1 receives the notification of the completion of the paying out process issued from the host computer 2, the normal transaction controlling section 7 supplies the cash of the desired money amount to the cash processing section of the automatic transaction apparatus 1 and controls a takeout slot so as to be opened. Further, the normal transaction controlling section 7 refers to a bill takeout guiding screen definition table stored in the storage section (for example, hard disk) 9 of the automatic transaction apparatus 1 to read out, based on the normal transaction screen address of the bill takeout guiding screen definition table, data (local information) of a screen (bill takeout guiding screen; refer to a lower side screen at step A50 in FIG. 5) for urging the user to take out bills from the storage section 9 of the automatic transaction apparatus 1, and causes the normal transaction screen displaying section 11 to display the read out data (step S70, bill takeout guiding screen display processing step). It is to be noted that, prior to such a screen displaying process as just described, processes such as validation of keys, initialization of data and so forth are performed as preparatory processes.

When such a displaying process of the bill takeout guiding screen on the normal transaction screen displaying section 11 by the normal transaction controlling section 7 as described above is performed, the additional information controlling section 8 refers, in an interlocking relationship with the displaying process, to the bill takeout guiding screen definition table stored in the storage section (for example, hard disk) 9 of the automatic transaction apparatus 1 to access the server 3 based on the global information address included in the additional information screen addresses (reference information screen addresses) of the bill takeout guiding screen definition table.

Then, the additional information controlling section 8 requests the server 3 for transmission of information (reference information screen upon bill takeout) to be referred to when the user takes out bills, and causes the additional information screen displaying section (reference information screen displaying section) 12 to display the reference information (for example, a guiding screen, for example, for urging the user not to forget to take out bills; refer to an upper side screen at step A50 in FIG. 5) transmitted from the server 3 [step S70; bill takeout guiding screen-corresponding additional information screen (reference information screen) displaying step].

The guiding screen for urging the user not to forget to take out bills includes link information (link button) for accessing information (for example, latest information regarding a card) regarding upgrading of a card.

It is to be noted that, where the user clicks the link button through the guiding screen displayed on the additional information screen displaying section 12 in order to refer to the information regarding the upgrading of a card, the additional information controlling section 8 requests the server 3 for transmission of the information regarding the upgrading of a card. Then, if the object information of the request is transmitted from the server 3, then the additional information controlling section 8 causes the additional information screen displaying section 12 to display the transmitted information.

Then, if takeout of bills by the user is completed (bill releasing completion), then the normal transaction controlling section 7 controls the card reader and the receipt printer of the automatic transaction apparatus 1 to release the card and a receipt. Further, the normal transaction controlling section 7 refers to a card/receipt takeout guiding screen definition table stored in the storage section (for example, hard disk) 9 of the automatic transaction apparatus 1 to read out, based on a normal transaction screen address of the card/receipt takeout guiding screen definition table, data (local information) of a screen (card/receipt takeout guiding screen; refer to a lower side screen at step A60 in FIG. 5; transaction ending screen) for urging the user to takeout a card/receipt from the storage section 9 of the automatic transaction apparatus 1, and causes the normal transaction screen displaying section 11 to display the read out data (step S80; card/receipt takeout guiding screen display processing step). It is to be noted that, prior to such a screen displaying process as just described, processes such as validation of keys, initialization of data and so forth are performed as preparatory processes.

When such a displaying process of the card/receipt takeout guiding screen on the normal transaction screen displaying section 11 by the normal transaction controlling section 7 as described above is performed, the additional information controlling section 8 refers, in an interlocking relation with the displaying process, to the card/receipt takeout guiding screen definition table stored in the storage section (for example, hard disk) 9 of the automatic transaction apparatus 1 to access the server 3 based on the global information address included in the additional information screen addresses (reference information screen addresses) of the card/receipt takeout guiding screen definition table.

Then, the additional information controlling section 8 requests the server 3 for transmission of information (reference information screen upon card/receipt takeout) to be referred to when the user takes out the card and the receipt, and causes the additional information screen displaying section (reference information screen displaying section) 12 to display the reference information [for example, an advertisement information screen which may lead to a further transaction; refer to an upper side screen at step A60 in FIG. 5] transmitted from the server 3 [step S80; card/receipt takeout guiding screen-corresponding additional information screen (reference information screen) displaying step].

Then, if takeout of the card and the receipt by the user is completed (card/receipt releasing completion), then the normal transaction controlling section 7 refers to the transaction continuation screen definition table stored in the storage section (for example, hard disk) 9 of the automatic transaction apparatus 1 to read out, based on a normal transaction screen address of the transaction continuation screen definition table, data (local information) of a screen (transaction continuation screen; not shown) for confirming whether or not the transaction is to be continued, and causes the normal transaction screen displaying section 11 to display the read out data (step S90; transaction continuation screen display processing step). It is to be noted that, prior to such a screen displaying process as just described, processes such as validation of keys, initialization of data and so forth are performed as preparatory processes.

When such a displaying process of the transaction continuation screen on the normal transaction screen displaying section 11 by the normal transaction controlling section 7 is performed, the additional information controlling section 8 refers, in an interlocking relationship with the displaying process, to the transaction continuation screen definition table stored in the storage section (for example, hard disk) 9 of the automatic transaction apparatus 1 to access the server 3 based on the global information address included in the additional information screen addresses (reference information screen addresses) of the transaction continuation screen definition table.

Then, the additional information controlling section 8 requests the server 3 for transmission of information (reference information screen upon transaction continuation) to be referred to when the user decides whether or not the transaction is to be continued, and causes the additional information screen displaying section (reference information screen displaying section) 12 to display the reference information transmitted from the server 3 [step S90; transaction continuation screen-corresponding additional information screen (reference information screen) displaying step].

It is to be noted that, while, in the present embodiment, the processes are performed so that the reference information is displayed on the additional information screen displaying section 12 at pertaining steps, the present invention is not limited to this, but the processes may be performed such that additional information such as advertisement information is displayed suitably.

[Description of the Additional Information Screen Displaying Process]

Incidentally, in the present embodiment, when a plurality of transaction screens are displayed in order on the normal transaction screen displaying section 11 as described hereinabove, reference information (reference information screen) is displayed on the additional information screen displaying section (reference information screen displaying section) 12. In particular, when a process for displaying a plurality of transaction screens in the automatic transaction apparatus 1 is executed in a main routine, such an additional information screen displaying process as shown in a flow chart of FIG. 6 may be executed as a sub routine.

Figure 6:
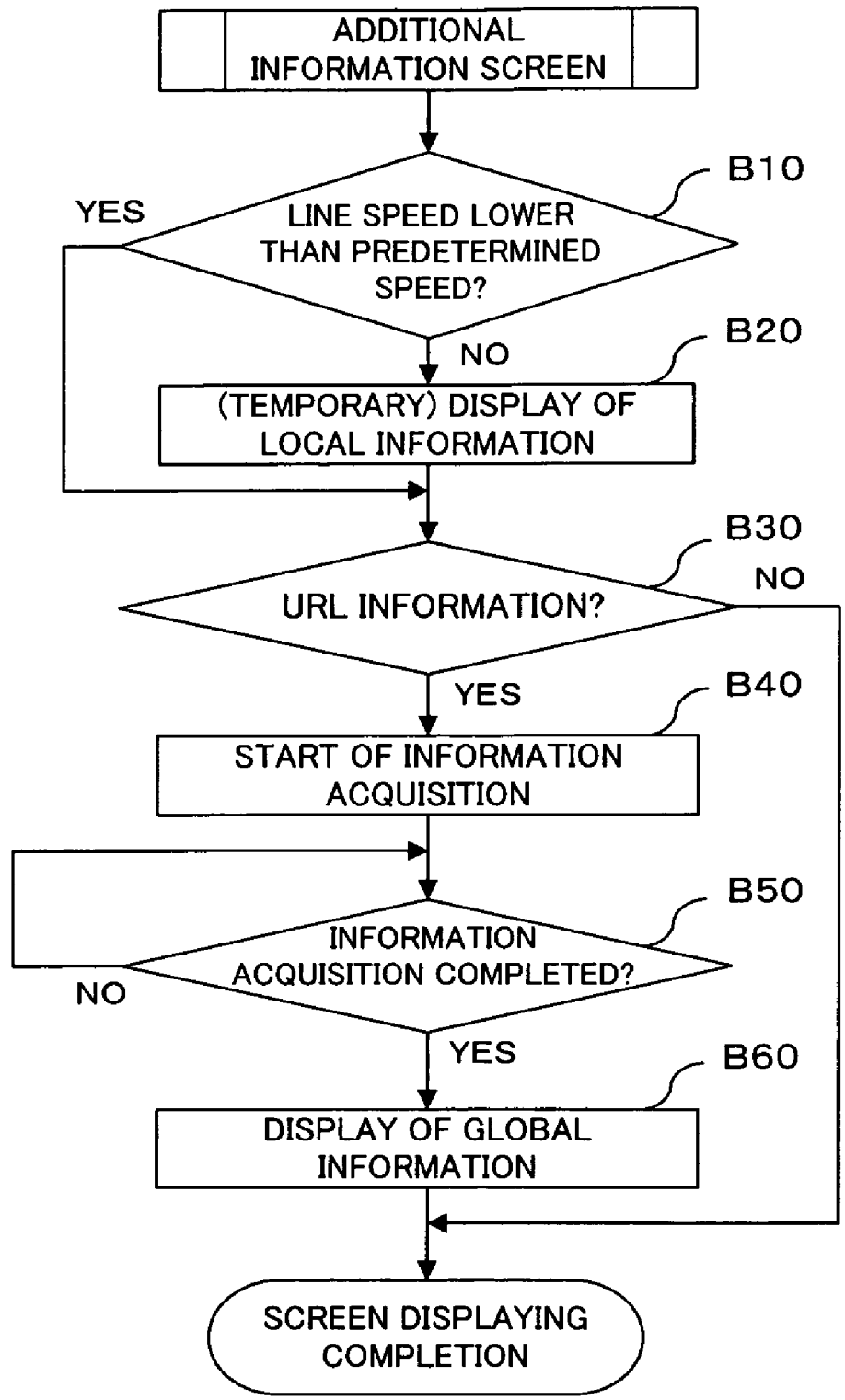
FIG. 6 is a flow chart illustrating an additional information screen displaying process executed by the automatic transaction apparatus according to the first embodiment of the present invention.

As shown in FIG. 6, in the additional information screen displaying process routine, the additional information controlling section 8 first decides whether or not a line speed of a line (Internet 5) which interconnects the automatic transaction apparatus 1 and the server 3 is a predetermined speed or less (step B10; a line speed decision step).

As a result, if it is decided that the line speed is not the predetermined speed or less (NO route), then the processing advances to step B20. At step B20, the additional information controlling section 8 reads out, based on the local information address included in the additional information screen addresses (reference information screen addresses) of the screen definition table stored in the storage section (for example, hard disk) 9 of the automatic transaction apparatus 1, data of a screen (local information screen) having additional information (local information; fixed information) such as, for example, advertisement information from the storage section 9 of the automatic transaction apparatus 1 and causes the additional information screen displaying section 12 to display the read out data (local information display processing step), and thereafter, the processing advances step B30.

It is to be noted that, where global information is to be displayed in a later process, the global information is displayed in place of the local information displayed here. Therefore, in this instance, the local information is temporarily displayed.

On the other hand, if it is decided that the line speed is the predetermined speed or less (YES route), then the processing advances to step B30.

At step B30, the additional information controlling section 8 decides whether or not the global information address is registered as an additional information screen address in the screen definition table stored in the storage section 9 of the automatic transaction apparatus 1.

As a result, if it is decided that the global information address is registered (YES route), then the additional information controlling section 8 accesses the server 3 based on the global information address to request the server 3 for transmission of reference information (additional information, global information) and starts acquisition of reference information (additional information, global information) stored in the storage section of the server 3 (step B40).

Then, the additional information controlling section 8 decides whether or not the information acquisition is completed (step B50). If it is decided that the information acquisition is completed (YES route), then the additional information controlling section 8 causes the additional information screen displaying section 12 to display the reference information (reference information screen) transmitted from the server 3 in place of the local information displayed at present (step B60), and then ends the processing.

It is to be noted that the decision of whether or not the information acquisition is completed is repetitively performed until after a decision result that the information acquisition is completed is obtained (NO route). Here, the decision of whether or not the information acquisition is completed may be decided, for example, from time such as lapse of a predetermined period of time or through detection of the last end of the transmitted data.

Incidentally, if it is decided at step B30 that the global information address is not registered (NO route), then the additional information controlling section 8 ends the processing without accessing the server 3. In this instance, at step B20, the local information screen of, for example, advertisement information or the like displayed on the additional information screen displaying section 12 continues to be displayed.

If such a configuration as described above is employed, then where the user who uses the automatic transaction apparatus 1 including such a function as described above wants not to use the function capable of acquiring information from the server 3 through the Internet 5, the user can select that the global information address should not be registered as the additional information screen address of the screen definition table.

It is to be noted that, while, in the present embodiment, the information to be displayed on the additional information screen displaying section 12 is basically acquired from the server 3 through the Internet 5 as described above, the acquisition of the information is not limited to this.

For example, the following measures may be taken. In particular, the screen information to be individually displayed on the additional information screen displaying section 12 at steps A10 to A60 of FIG. 5 is stored as local information in the storage section 9 of the automatic transaction apparatus 1. Then, when a plurality of transaction screens are successively displayed on the normal transaction screen displaying section 11, the additional information controlling section 8 reads out the local information stored in the storage section 9 of the automatic transaction apparatus 1 as reference information and causes the additional information screen displaying section (reference information screen displaying section) 12 to display the reference information. Further, where it becomes necessary to acquire information from the server 3 through the Internet 5, the additional information controlling section 8 may access the server 3 through the Internet 5 similarly as in the process of the embodiment described above.

[Description of a Process When a Personal Identification Number is Forgotten]

Now, a process when the user has forgotten its personal identification number upon inputting of a personal identification number (password) is described with reference to FIG. 7.

As seen from step C10 of FIG. 7, where the user has forgotten the password, then if the user inputs a URL (address; here, http://www.xxx.com) of a predetermined personal identification number keyword searching site through the additional information screen displaying section (reference information screen displaying section; refer to an upper side screen at step C10) 12, then the additional information controlling section 8 accesses, based on the inputted URL, the server 3, in which the personal identification number keyword searching site is provided, through the Internet 5 to request the server 3 for transmission of a personal identification number keyword searching Web page (personal identification number searching screen; refer to an upper side screen at step C20). Then, if the personal identification number keyword searching Web page is transmitted from the server 3, then the additional information controlling section 8 causes the additional information screen displaying section 12 to display the Web page (step C20).

Then, if the user inputs a keyword for searching the personal identification number while the user refers to the Web page displayed on the additional information screen displaying section 12, then the additional information controlling section 8 transmits the inputted keyword to the server 3 through the Internet 5.

A personal identification number searching table, wherein personal identification numbers and keywords are coordinated with each other, is stored in advance in the storage section of the server 3, and if a keyword is transmitted from the additional information controlling section 8, then the server 3 refers to the personal identification number searching table to search the personal identification number based on the keyword (this function is called searching section). Then, if the personal identification number corresponding to the keyword is found, the server 3 transmits the found personal identification number to the additional information controlling section 8 through the Internet 5. It is to be noted that, when the password or personal identification number is to be transmitted through the Internet 5, preferably it is encrypted and transmitted.

Then, if the personal identification number is transmitted from the server 3 through the Internet 5, then the additional information controlling section 8 causes the additional information screen displaying section 12 to display the transmitted personal identification number (personal identification number displaying screen including the personal identification number; reference information screen; refer to an upper side screen at step C30) (step C30).

Consequently, since, even if the user has forgotten the personal identification number, the personal identification number is displayed on the additional information screen displaying section 12 through the keyword searching process, the user can input the personal identification number through the personal identification number inputting screen displayed on the normal transaction screen displaying section 11 while the user observes the displayed personal identification number. As a result, there is an advantage that, even if the user has forgotten the personal identification number, the transaction can be performed with certainty.

[Description of a Process upon Communication Fault]

Now, a process where, for example, a communication fault or the like occurs when the additional information controlling section 8 acquires information from the server 3 through the Internet 5 is described with reference to FIG. 8.

It is to be noted that description here is given taking a case wherein, upon inputting of a personal identification number, the additional information controlling section 8 accesses the server 3 through the Internet 5 to acquire reference information as an example.

Figure 8:
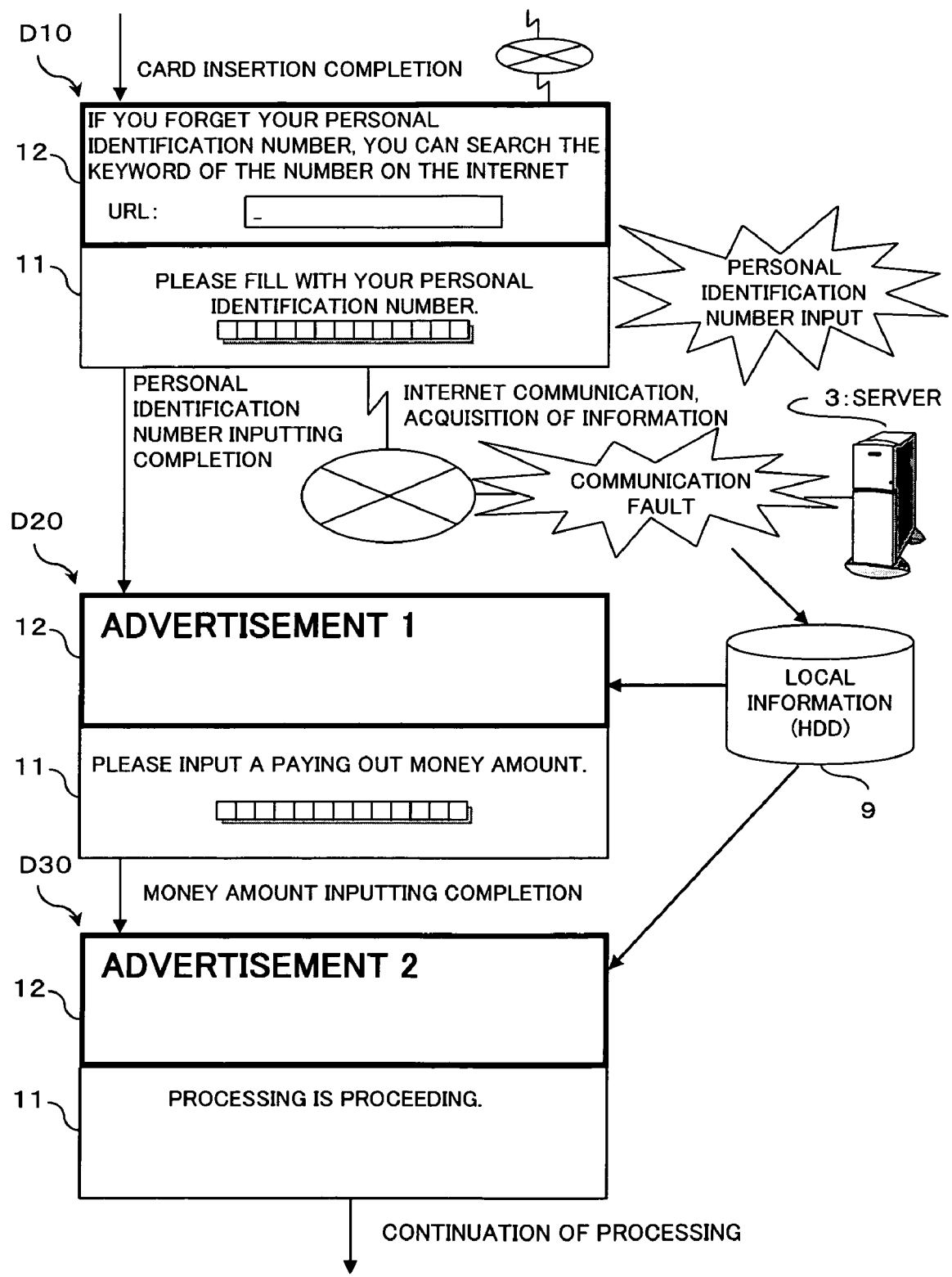
FIG. 8 is a flowchart illustrating a process executed, where, for example, a communication fault or the like occurs upon acquisition of information from the Internet, by the automatic transaction apparatus according to the first embodiment of the present invention.

If insertion of a card is completed as described hereinabove, then such screens as shown at step D10 of FIG. 8 are displayed on the normal transaction screen displaying section 11 and the additional information screen displaying section 12. Then, if the user inputs its personal identification number through the personal identification number inputting screen displayed on the normal transaction screen displaying section 11 (personal identification number inputting completion), then the normal transaction controlling section 7 performs a predetermined process and then causes the normal transaction screen displaying section 11 to display, for example, the paying out money amount inputting screen (step D20; refer to a lower side screen).

When such a displaying process of the paying out money amount inputting screen on the normal transaction screen displaying section 11 by the normal transaction controlling section 7 as described above is performed, the additional information controlling section 8 accesses, in an interlocking relationship with the displaying process, the server 3 through the Internet 5 based on the global information address included in the additional information screen addresses (reference information screen addresses) of the money amount inputting screen definition table to request the server 3 for transmission of reference information (reference information screen) in order to cause the additional information screen displaying section (reference information screen displaying section) 12 to display information (reference information screen) to be referred to when the user inputs a paying out money amount.

However, for example, if a communication fault or the like occurs, then even if a request for transmission of reference information is issued to the server 3, for example, a response of failure in connection or a response that object information of the request cannot be acquired or the like is returned to the additional information controlling section 8.

Where, for example, a response of failure in connection is received in this manner (that is, where Internet communication cannot be performed), the additional information controlling section 8 stops the acquisition of information from the server 3 through the Internet 5.

Then, the additional information controlling section 8 enters a process for offline, and reads out additional information (fixed information) such as, for example, advertisement information or reference information (local information) from the storage section (for example, hard disk) 9 of the automatic transaction apparatus 1 based on the local information address included in the additional information screen addresses of the money amount inputting screen definition table and causes the additional information screen displaying section 12 to display the read out additional information or reference information (step D20: refer to an upper side screen).

Thereafter, if the user inputs a paying out money amount through the paying out money amount inputting screen displayed on the normal transaction screen displaying section 11 (paying money amount inputting completion), then the normal transaction controlling section 7 performs a predetermined process and then causes the normal transaction screen displaying section 11 to display a screen indicating that the process is proceeding (communication with the host is proceeding) (step D30: refer to a lower side screen).

Since, for example, a response of failure in connection was received at the preceding step and the process for offline has been entered as described above, when the displaying process of the screen indicating that the process to the normal transaction screen displaying section 11 by the normal transaction controlling section 7 is proceeding is performed, the additional information controlling section 8 reads out, in an interlocking relationship with the displaying process, additional information (fixed information) such as, for example, advertisement information or reference information (local information) from the storage section (for example, hard disk) 9 of the automatic transaction apparatus 1 based on the local information address included in the additional information screen addresses of the host communication screen definition table and causes the additional information screen displaying section 12 to display the read out additional information or reference information (step D30; refer to an upper side screen).

It is to be noted here that, for example, if a communication fault or the like occurs, then since a response of failure in connection or the like is returned, when the response is received, the additional information controlling section 8 stops the acquisition of global information from the server 3 and enters a process for online and then acquires local information from the storage section 9 of the automatic transaction apparatus 1. However, the acquisition of such local information is not limited to this but may be performed in the following manner. In particular, for example, when the elapsed time after a transmission request for reference information is issued to the server 3 becomes equal or longer than a predetermined period of time, the acquisition of global information from the server 3 is stopped (timeout) and local information is acquired from the storage section 9 of the automatic transaction apparatus 1.

Further, also when the normal transaction controlling section 7 causes the normal transaction screen displaying section 11 to display a next screen after a response of failure in connection or the like is received and a process for offline is entered, the additional information controlling section 8 acquires local information from the storage section 9 of the automatic transaction apparatus 1 as a process for offline. However, the acquisition of such global information is not limited to this but may be performed in the following manner. In particular, for example, when the normal transaction controlling section 7 causes the normal transaction screen displaying section 11 to display a next screen, the additional information controlling section 8 tries to access the server 3 to acquire global information again. As a result, for example, if a response of failure in connection or the like is received, then a process similar to that described above may be performed to acquire local information to display a next screen.

It is to be noted here that, while an example wherein such a process as described above is applied to a case wherein, upon inputting of a personal identification number, the additional information controlling section 8 accesses the server 3 through the Internet 5 to acquire reference information (global information) is described, the application of such a process as described above is not limited to this.

In particular, when the normal transaction controlling section 7 performs a process of causing the normal transaction screen displaying section 11 to display a plurality of screens in order, the additional information controlling section 8 tries to access the server 3 through the Internet 5 to acquire individual reference information or additional information (global information) in order to cause the additional information display section 12 to display reference information or additional information (global information) corresponding to the individual processes. Therefore, such a process as described above can be applied also to such an instance as just described.

Further, where the additional information controlling section 8 first accesses the server 3 to acquire the reference information acquiring access screen (refer to the upper side screens at steps A20, A30 of FIG. 5) or the reference information screen (at steps A40, A50 of FIG. 5) and causes the additional information screen displaying section 12 to display the acquired screen and then accesses the server 3 again when the user issues an instruction for acquiring reference information or link information through the reference information acquiring access screen or the reference information screen, the additional information controlling section 8 accesses the server 3 again in order to acquire the reference information or link information. Therefore, also in this instance, such a process as described above can be applied.

Figure 9:
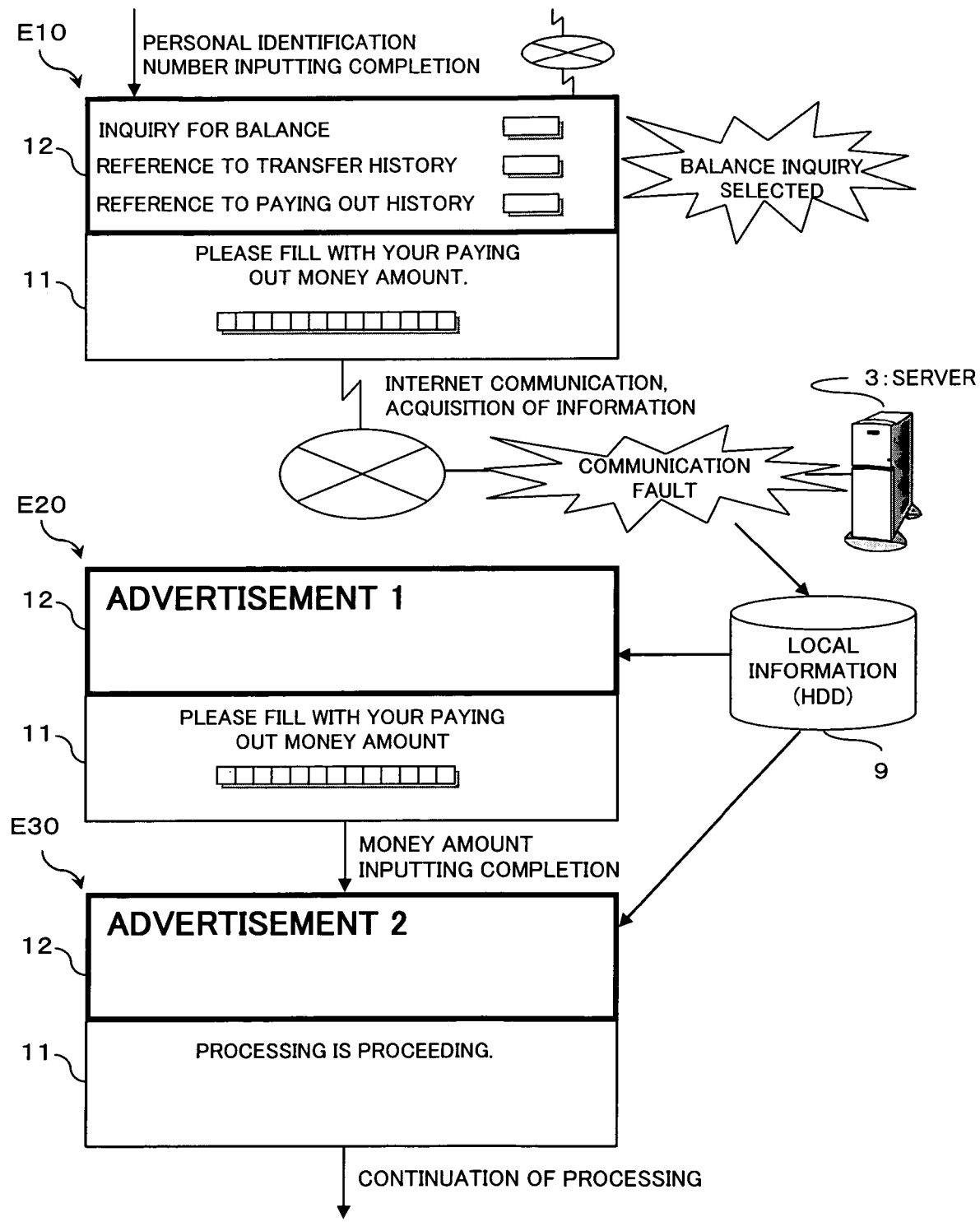
FIG. 9 is a flow chart illustrating another process executed, where, for example, a communication fault or the like occurs upon acquisition of information from the Internet, by the automatic transaction apparatus according to the first embodiment of the present invention.

Description is given with reference to FIG. 9 taking a case wherein the user selects the balance inquiry when, for example, the transaction selection screen (refer to the upper side screen at step A30 of FIG. 5) is displayed as the reference information acquiring access screen on the additional information screen displaying section 12 as an example.

When inputting of a personal identification number is completed as described hereinabove, such screens as shown at step E10 of FIG. 9 are displayed on the normal transaction screen displaying section 11 and the additional information screen displaying section 12.

If, in this state, the user clicks the balance inquiry selection button of the transaction selection screen displayed on the additional information screen displaying section 12 in order to acquire balance inquiry information as reference information to be referred to when the user inputs a paying out money amount, then the additional information controlling section 8 transmits a balance inquiry instruction coordinated with the balance inquiry selection button and user identification information (for example, a card number) read from the card inserted to request the server 3 to transmit balance information specified by the user identification information.

However, for example, if a communication fault or the like occurs, then even if a request for transmission of balance information (reference information) to the server 3 is issued, a response of failure in connection or a response that the object information of the request cannot be acquired is returned to the additional information controlling section 8.

Where, for example, a response of failure in connection or the like is received in this manner (that is, when Internet communication cannot be performed), the additional information controlling section 8 stops the acquisition of information from the server 3 through the Internet 5.

Then, the additional information controlling section 8 enters a process for offline, and reads out additional information (fixed information) such as, for example, advertisement information or reference information (local information) from the storage section (for example, hard disk) 9 of the automatic transaction apparatus 1 based on the local information address included in the additional information screen addresses of the money amount inputting screen definition table and causes the additional information screen displaying section 12 to display the read out additional information or reference information (step E20: refer to an upper side screen).

Thereafter, if the user inputs a paying out money amount through the paying out money amount inputting screen displayed on the normal transaction screen displaying section 11 (paying money amount inputting completion), then the normal transaction controlling section 7 performs a predetermined process and then causes the normal transaction screen displaying section 11 to display the screen indicating that the process is proceeding (communication with the host is proceeding) (step E30: refer to a lower side screen).

Since, for example, a response of failure in connection or the like was received at the preceding step and the process for offline has been entered as described above, when the displaying process of the screen indicating that the process to the normal transaction screen displaying section 11 by the normal transaction controlling section 7 is proceeding is performed, the additional information controlling section 8 reads out, in an interlocking relationship with the displaying process, additional information (fixed information) such as, for example, advertisement or reference information (local information) from the storage section (for example, hard disk) 9 of the automatic transaction apparatus 1 based on the local information address included in the additional information screen addresses of the host communication screen definition table and causes the additional information screen displaying section 12 to display the read out additional information or reference information (step E30; refer to an upper side screen).

[Description of a Process When a Money Amount Inputting Miss Occurs]

Now, a process where an input miss occurs when the user inputs a paying out money amount is inputted is described with reference to FIG. 10.

Figure 10:
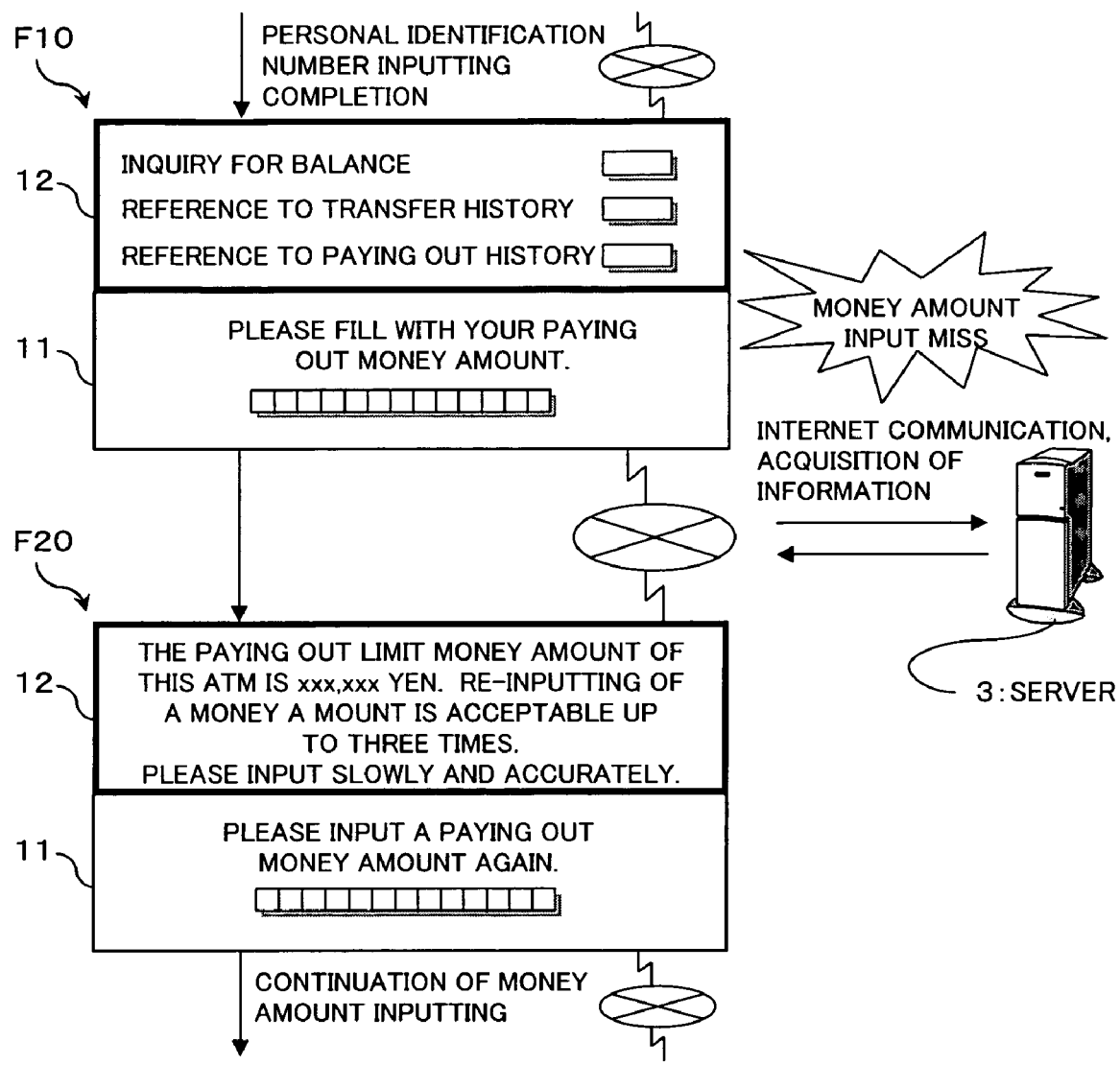
FIG. 10 is a flow chart illustrating a process executed, where an input miss of an amount of money occurs, by the automatic transaction apparatus according to the first embodiment of the present invention.

When inputting of a personal identification number is completed as described hereinabove, such screens as shown at step F10 of FIG. 10 are displayed on the normal transaction screen displaying section 11 and the additional information screen displaying section 12. Then, if the user inputs a paying out money amount through the paying out money amount inputting screen displayed on the normal transaction screen displaying section 11, then the normal transaction controlling section 7 performs such a process as to cause such a confirmation screen as described hereinabove to be displayed and so forth and then transmits the inputted paying out money amount to the host computer 2 through the private line (or public line) 4.

Then, the host computer 2 performs a process necessary for paying out based on the paying out money amount transmitted from the automatic transaction apparatus 1. In this process, the host computer 2 first decides whether or not the paying out money amount is greater than a paying out limit money amount.

The paying out limit money amount depends upon the structure of the automatic transaction apparatus 1 such as the size of the takeout slot of the automatic transaction apparatus 1 and so forth. For example, it is a possible idea to store paying out limit money amounts corresponding to the sizes of the takeout slots of the individual automatic transaction apparatus 1 as paying out limit money amount tables corresponding to the individual automatic transaction apparatus 1 and read out the paying out limit money amount of a pertaining one of the automatic transaction apparatus 1 using the paying out limit money amount table to decide whether or not the paying out money amount exceeds the paying out limit money amount.

It is to be noted that the paying out limit money amount may otherwise be the balance money amount remaining in the account of the user. In this instance, the balance money amount of an individual user may be read out to decide whether or not the paying out money amount exceeds the balance money amount (paying out limit money amount).

As a result of the decision, if it is decided that the paying out money amount exceeds the paying out limit money amount, then the host computer 2 determines that the inputted money amount is a miss and notifies the normal transaction controlling section 7 through the private line (or public line) 4 that the inputted money amount is a miss.

When the normal transaction controlling section 7 receives the notification from the host computer 2 that the inputted money amount is a miss, it reads out data of a screen (paying out money amount re-inputting screen; refer to a lower side screen at step F20 of FIG. 10) for urging the user to re-input a paying out money amount from the storage section 9 of the automatic transaction apparatus 1 based on a normal transaction screen address of a paying out (withdrawal) money amount re-inputting screen definition table and causes the normal transaction screen displaying section 11 to display the screen [step F20; paying out (withdrawal) money amount re-inputting screen displaying step].

When such a process of causing the normal transaction screen displaying section 11 to display the screen for urging the user to re-input a paying out money amount is performed by the normal transaction controlling section 7 in this manner, the additional information controlling section 8 refers, in an interlocking relationship with the process, to the paying out (withdrawal) money amount re-inputting screen definition table stored in the storage section (for example, hard disk) 9 of the automatic transaction apparatus 1 to access the server 3 based on the global information address from between the additional information screen addresses (reference information screen addresses) of the paying out (withdrawal) money amount re-inputting screen definition table.

Then, the additional information controlling section 8 requests the server 3 for transmission of information (reference information screen upon paying out money amount re-inputting) to be referred to when the user re-inputs a paying out money amount, and causes the additional information screen displaying section (reference information screen displaying section) 12 to display the reference information [for example, money amount re-inputting guiding screen; refer to an upper side screen at step F20 of FIG. 10; information including the paying out limit money amount] transmitted from the server 3 [step F20; paying out (withdrawal) money amount re-inputting screen-corresponding additional information screen (reference information screen) displaying step].

The money amount re-inputting guiding screen here is formed as a screen for guiding the paying out limit money amount, the number of times (for example, three times) for re-inputting of a paying out money amount and so forth as seen from an upper side screen at step F20 of FIG. 10.

[Description of a Process When a Desired Transaction is Selected through the Additional Information Screen Displaying Section]

Now, a process executed by the additional information controlling section 8 when the user selects a desired transaction through the transaction selection screen displayed on the additional information screen displaying section 12 is described with reference to FIG. 11.

It is to be noted that, while, in the present embodiment, for example, a balance inquiry, a transfer history inquiry, a paying out history inquiry or the like can be selected as the desired transaction, description is given taking a case wherein the balance inquiry is selected as an example.

Figure 11:
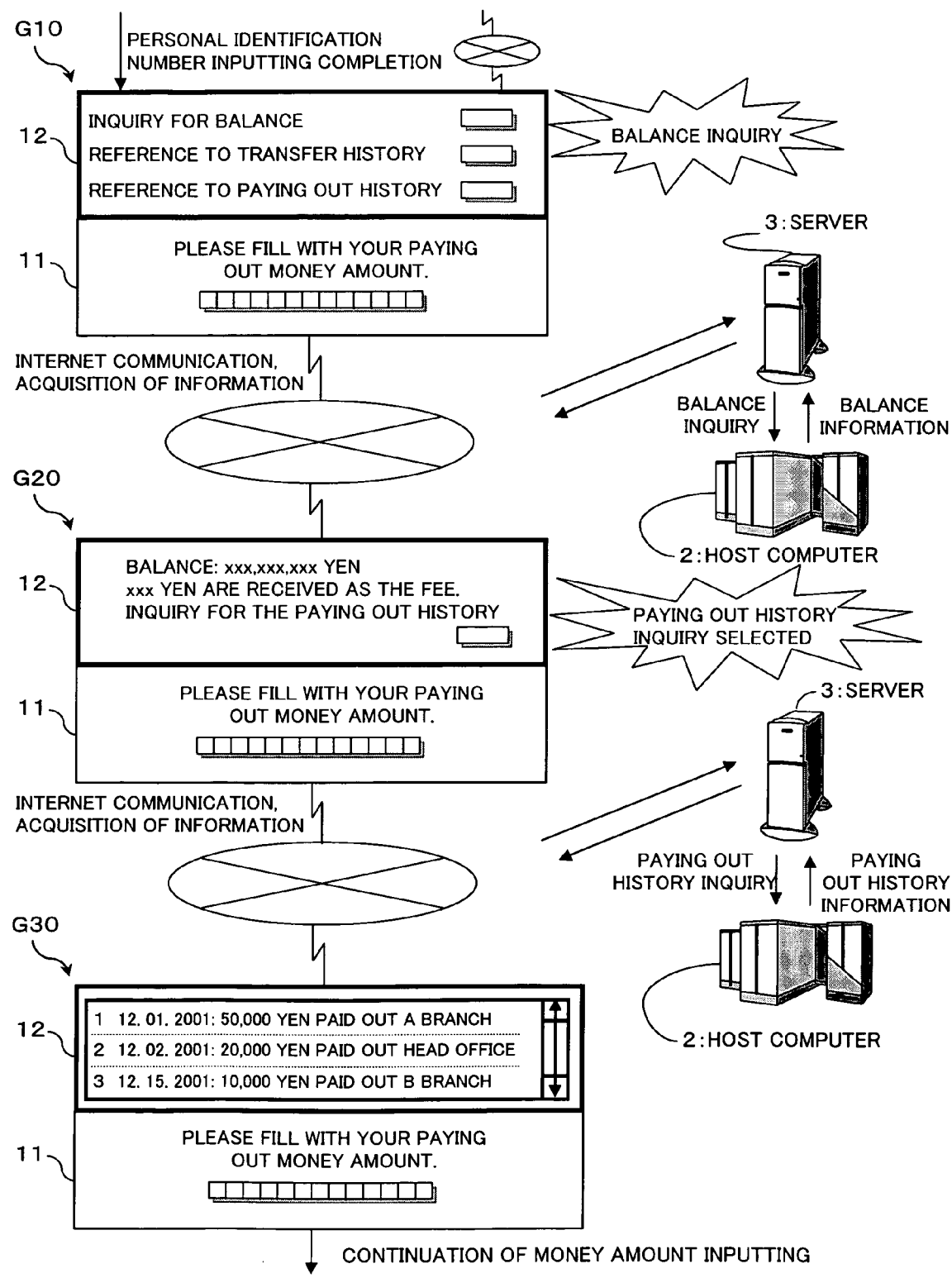
FIG. 11 is a flow chart illustrating a process executed, where an instruction for a balance inquiry or a withdrawal history inquiry is issued through an additional information screen displaying section, by the automatic transaction apparatus according to the first embodiment of the present invention.

When inputting of a personal identification number is completed as described hereinabove, such screens as shown at step G10 of FIG. 11 are displayed on the normal transaction screen displaying section 11 and the additional information screen displaying section 12.

If, in this state, the user selects the balance inquiry through the transaction selection screen displayed on the additional information screen displaying section 12 in order to acquire balance inquiry information as reference information to be referred to when the user inputs a paying out money amount (if the user clicks the valance inquiry selection button), then the additional information controlling section 8 transmits a balance inquiry instruction coordinated with the balance inquiry selection button and user identification information (for example, a card number) read from the card inserted to request the server 3 to transmit balance information specified by the user identification information.

In response to the request, the server 3 transmits the balance inquiry instruction (transaction information requesting instruction) and the user identification information (for example, card number) to the host computer 2 to request the host computer 2 to transmit the balance information of the user specified by the user identification information to the server 3.

Thereafter, when the server 3 receives the balance information of the specific user transmitted from the host computer 2, it produces a balance information screen (transaction information screen; refer to an upper side screen at step G20 of FIG. 11) based on the balance information and transmits the balance information screen to the additional information controlling section 8. The additional information controlling section 8 receiving the balance information screen causes the additional information screen displaying section 12 to display the balance information screen [step G20; paying out (withdrawal) money amount inputting screen-corresponding additional information screen (reference information screen) displaying step].

The balance information screen here includes an amount of money indicative of the balance and an amount of money of the fee and further includes link information (link button), for example, for accessing paying out history information as seen on an upper side screen at step G20 of FIG. 11.

It is to be noted here that, while the balance information screen is configured so as to include link information (link button) for accessing paying out history information, the balance information screen is not limit to this but may otherwise include link information (link button) for accessing information (transaction information) regarding some other transaction such as, for example, transfer history information.

Consequently, since the balance information is displayed as reference information on the additional information screen displaying section 12, the user can observe the balance information and perform inputting of a paying out money amount accurately and with certainty through the paying out money amount inputting screen displayed on the normal transaction screen displaying section 11.

Further, if the user clicks the link button on the balance inquiry screen displayed on the additional information screen displaying section 12 in order to refer to the paying out history information, then the additional information controlling section 8 transmits a paying out history inquiry instruction [transaction information requesting instruction] related to the link button and the user identification information (for example, a card number) read from the card inserted to the server 3 to request the server 3 to transmit the paying out history information (transaction information) of the user specified by the user identification information.

In response to the request, the server 3 transmits the paying out history inquiry instruction and the user identification information (for example, a card number) to the host computer 2 to request the host computer 2 to transmit the paying out history information of the user specified by the user identification information to the server 3.

When the server 3 receives the paying out history information of the specific user transmitted from the host computer 2, it produces a paying out history information screen (transaction information screen; refer to an upper side screen at step G30 of FIG. 11) based on the paying out history information and transmits the paying out history information screen to the additional information controlling section 8. The additional information controlling section 8 receiving the paying out history information screen causes the additional information screen displaying section (the reference information screen displaying section) 12 to display the paying out history information screen [step G30; paying out (withdrawal) money amount inputting screen-corresponding additional information screen (reference information screen) displaying step].

It is to be noted here that, while the description given above relates to a case wherein balance information is acquired as the reference information, acquisition of some other information such as, for example, transfer history information or paying out history information is performed similarly.

[Description of a Modification to the Transaction Selection Screen Displayed on the Additional Information Screen Displaying Section]

Incidentally, it has been described that, when the transaction selection screen is displayed first on the additional information screen displaying section 12 and the user clicks the balance inquiry selection button on the transaction selection screen, the additional information controlling section 8 transmits user identification information (for example, a card number) read from a card inserted together with the balance inquiry instruction coordinated with the balance inquiry selection button. However, the procedure is not limited to this.

In the following, a modification is described with reference to FIG. 12.

Figure 12:
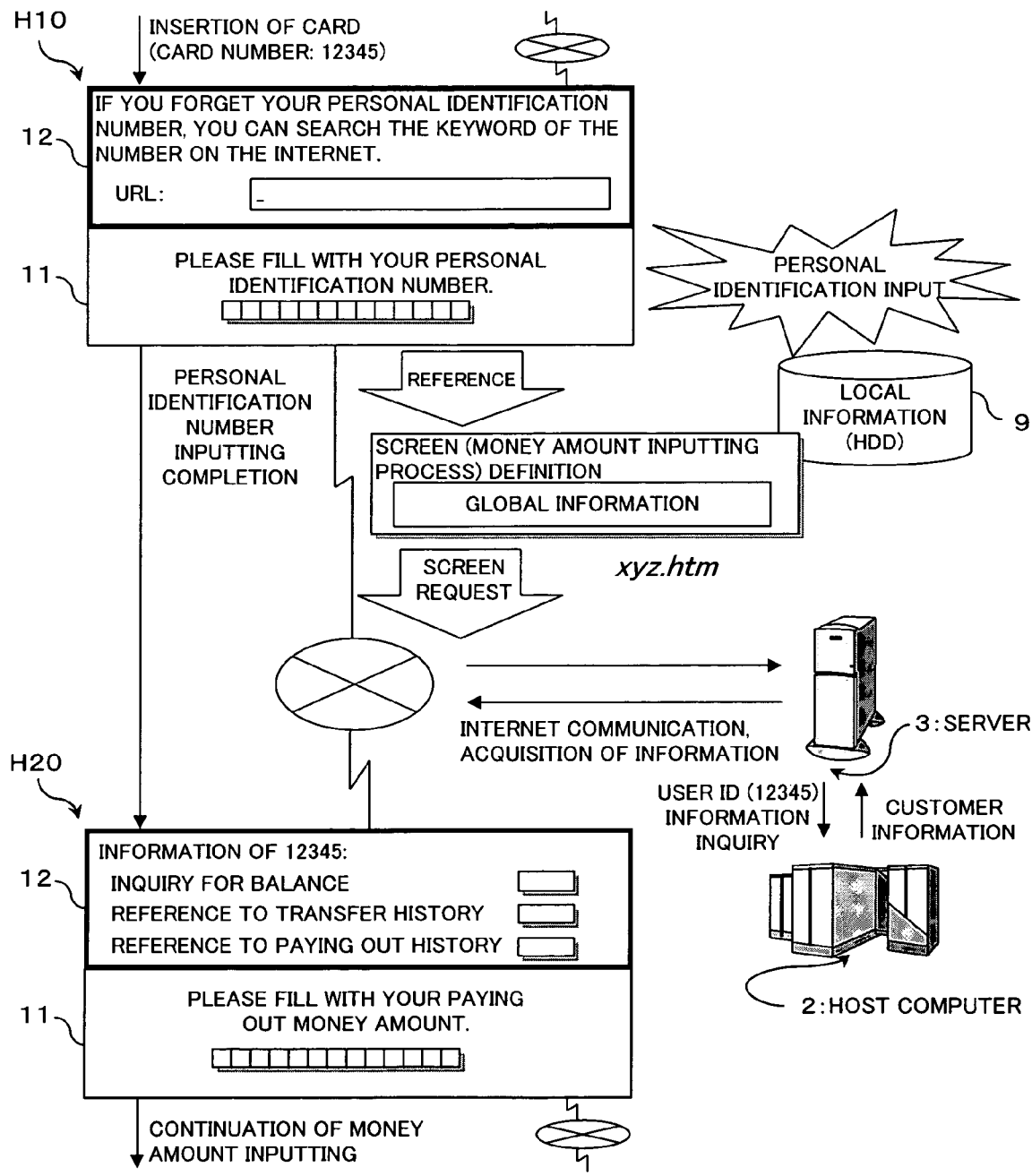
FIG. 12 is a flow chart illustrating a modification to a displaying process of a reference information transaction selection screen executed by the automatic transaction apparatus according to the first embodiment of the present invention.

When insertion of a card is completed as described hereinabove, such screens as shown at step H10 of FIG. 12 are displayed on the normal transaction screen displaying section 11 and the additional information screen displaying section 12. Then, if the user inputs a personal identification number through the personal identification number inputting screen displayed on the normal transaction screen displaying section 11 (personal identification number inputting completion), then the normal transaction controlling section 7 performs a predetermined process and then causes the normal transaction screen displaying section 11 to display, for example, the paying out money amount inputting screen (step H20; refer to a lower side screen).

When such a displaying process of the paying out money amount inputting screen on the normal transaction screen displaying section 11 by the normal transaction controlling section 7 as described above is performed, the additional information controlling section 8 accesses, in an interlocking relationship with the displaying process, the server 3 through the Internet 5 based on the global information address included in the additional information screen addresses (reference information screen addresses) of the money amount inputting screen definition table to request the server 3 for transmission of reference information (reference information screen) in order to cause the additional information screen displaying section 12 to display information (reference information screen upon paying out money amount inputting; for example, transaction selection screen for reference information) to be referred to when the user inputs a paying out money amount.

In the present modification, upon such transmission request for reference information to the server 3, also the user identification information (for example, a card number) read from the inserted card is transmitted together.

In response to the transmission request, the server 3 transmits the user identification information (for example, a card number) and a transaction information inquiry instruction for inquiry for information (for example, balance information, transfer history information, paying out history information and so forth) relating to various transactions required to produce a transaction selection screen for reference information to request the host computer 2 to transmit transaction information of the user specified by the user identification information to the server 3.

Then, when the server 3 receives the various transaction information of the specific user transmitted from the host computer 2, it stores the transaction information (for example, balance information, transfer history information, paying out history information and so forth) individually into predetermined addresses of the storage section. Then, the server 3 produces a reference information transaction selection screen (refer to an upper side screen at step H20 of FIG. 12) for the specific user which includes a plurality of link buttons (here, a balance inquiry selection button, a transfer history inquiry selection button and a paying out history inquiry selection button) coordinated with the addresses in which the information is stored and transmits the reference information transaction selection screen to the additional information controlling section 8.

The additional information controlling section 8 receiving the reference information transaction selection screen causes the additional information screen displaying section (reference information screen displaying section) 12 to display the reference information transaction selection screen [step H20: paying out (withdrawal) money amount inputting screen-corresponding additional information screen (reference information screen) displaying step].

If, in this state, the user selects, for example, the balance inquiry through the transaction selection screen displayed on the additional information screen displaying section 12 in order to acquire, for example, balance inquiry information as reference information to be referred to when the user inputs a paying out money amount (if the user clicks the valance inquiry selection button), then the additional information controlling section 8 transmits the address (address for balance information), in which the balance information with the balance inquiry section button is stored, of the storage section of the server 3 to the server 3 to request the server 3 to transmit the balance information of the specific user.

In response to the request, the server 3 reads out the balance information of the specific user from the storage section based on the address for balance information, produces a balance information screen (transaction information screen; refer to an upper side screen at step G20 of FIG. 11) based on the read out balance information, and transmits the balance information screen to the additional information controlling section 8. The additional information controlling section 8 receiving the balance information screen causes the additional information screen displaying section (reference information screen displaying section) 12 to display the balance information screen [paying out (withdrawal) money amount inputting screen-corresponding additional information screen (reference information screen) displaying step].

It is to be noted here that, while the description given above relates to a case wherein balance information is acquired as reference information, acquisition of some other information such as, for example, transfer history information or paying out history information is performed similarly.

[Operation, Effects]

Accordingly, with the automatic transaction apparatus according to the present embodiment, since the additional information controlling section 8, additional information screen displaying section 12 and so forth are provided and reference information can be acquired through the Internet 5, reference information can be acquired in parallel from a different route (through a line different from a line used for a normal transaction) independently of a normal transaction without disturbing a series of processes executed as a normal transaction by the normal transaction controlling section 7 and the normal transaction screen displaying section 11.

Consequently, information (reference information, additional information) which can be referred to when a transaction such as, for example, a balance inquiry, a cash transaction such as money deposition or money withdrawal, a transfer, a passbook entry, an inquiry for details of used money amounts or an available money amount can be displayed simultaneously with the normal transaction screen, and the reference information can be provided at a suitable point of time. As a result, there are advantages that the operability of the automatic transaction apparatus is improved, that the time required for transaction can be reduced and that an efficient and accurate transaction can be achieved.

Particularly in a transaction which gives rise to a variation in the substance of an account such as withdrawal (paying out) or transfer (money transfer), since confirmation of the substance of the account can be performed in parallel during the transaction, the transaction for confirmation need not be retried from the beginning, and wasteful transaction time can be eliminated.

Further, since, in a loan transaction or the like, the transaction can be carried forward while individual information such as the rate of interest and the term of payment is confirmed, such operations as to cancel the transaction having proceeded to halfway and retry inputting in order to confirm the individual information such as the rate of interest and the term of payment and so forth can be reduced, and wasteful transaction time can be eliminated.

It is to be noted that, while, in the embodiment described above, the additional information controlling section 8 is configured so as to have a function of acquiring additional information, it may be configured otherwise such that it additionally has a function of updating local information stored in the storage section 9 of the automatic transaction apparatus 1. In this instance, the additional information controlling section 8 may be configured so as to access a predetermined server through the Internet 5, for example, after every predetermined interval of time to acquire new local information and update the local information stored in the storage section 9 with the acquired new local information.

Second Embodiment

Now, an automatic transaction apparatus and a screen displaying method for the automatic transaction apparatus according to a second embodiment of the present invention are described with reference to FIG. 13.

In particular, in the first embodiment described above, when inputting of a personal identification number is completed, the normal transaction controlling section 7 performs such a process as to cause such a transaction selection screen as described above to be displayed (here, it is assumed that paying out is selected) and then causes the normal transaction screen displaying section 11 to display a screen for urging the user to input a paying out money amount (withdrawal money amount), and the additional information controlling section 8 causes, in an interlocking relationship with the displaying process, the additional information screen displaying section 12 to display the reference information transaction selection screen (refer to the upper side screen at step A30 of FIG. 5). In contrast, in the present second embodiment, the additional information controlling section 8 causes the additional information screen displaying section 12 to display, in place of the reference information transaction selection screen, a home banking access screen (refer to an upper side screen at step J10 of FIG. 13) including link information (link button) for accessing home banking (Internet banking, on-line banking).

It is to be noted that a basic configuration, a screen displaying method and so forth of the automatic transaction apparatus 1 are similar to those of the first embodiment described above, and therefore, description of them is omitted here.

Figure 13:
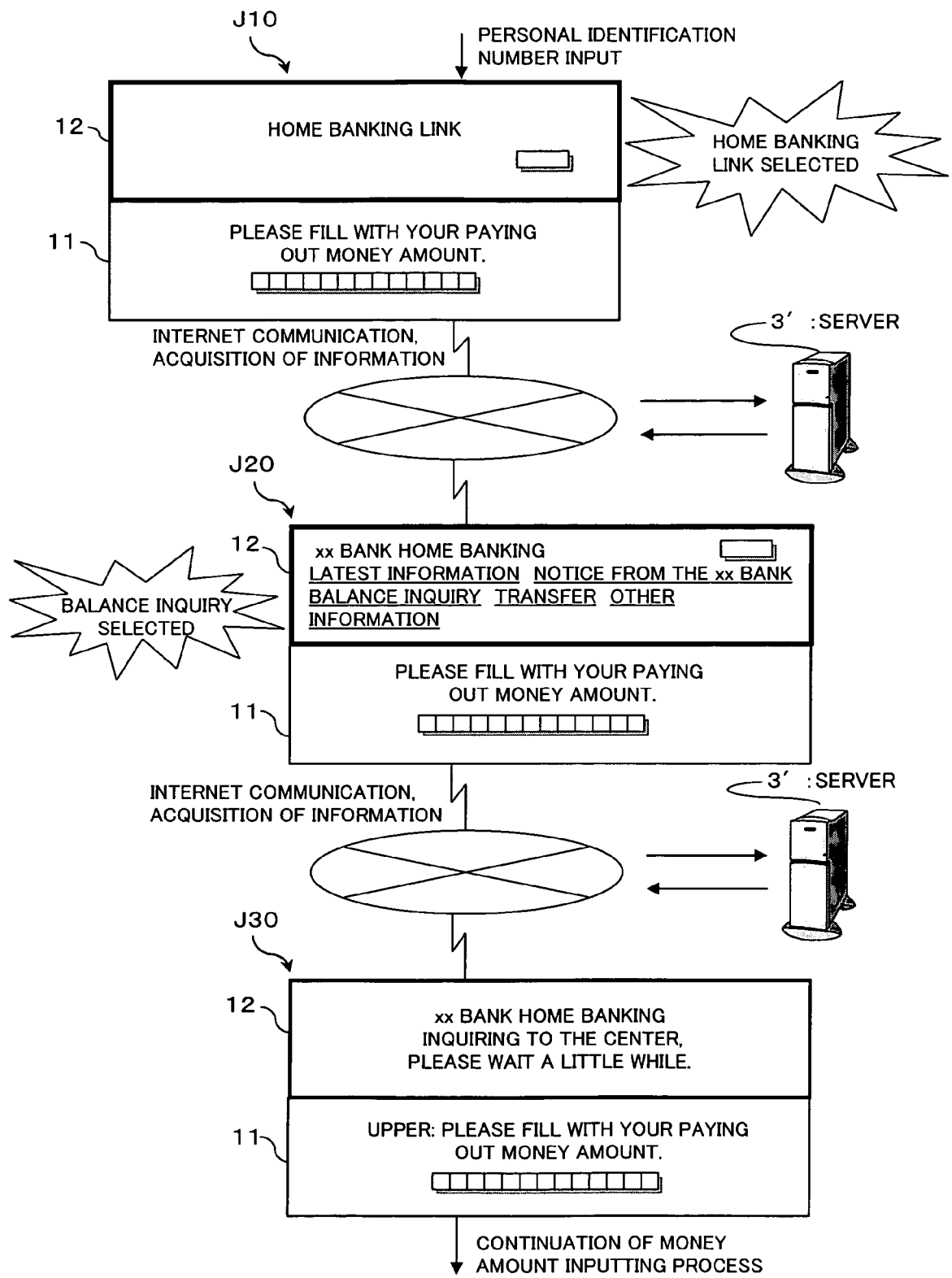
FIG. 13 is a flow chart illustrating a process executed upon cooperation with home banking using an automatic transaction apparatus according to a second embodiment of the present invention.

In the present embodiment, as seen in FIG. 13, when inputting of a personal identification number is completed, the normal transaction controlling section 7 performs such processes as to display such a transaction selection screen as described hereinabove (here, it is assumed that paying out is selected). Then, the normal transaction controlling section 7 refers to the money amount inputting screen definition table stored in the storage section (for example, hard disk) 9 of the automatic transaction apparatus 1 to read out data (local information) of the screen [paying out (withdrawal) money amount inputting screen; refer to a lower side screen at step J10 of FIG. 13] for urging the user to input a paying out money amount (withdrawal money amount) and causes the normal transaction screen displaying section 11 to display the screen [step J10; paying out (withdrawal) money amount inputting screen displaying processing step]. It is to be noted that, prior to such a screen displaying process as just described, processes such as validation of keys, initialization of data and so forth are performed as standard processes.

When such a displaying process of the paying out money amount inputting screen on the normal transaction screen displaying section 11 by the normal transaction controlling section 7 is performed, the additional information controlling section 8 refers, in an interlocking relationship with the displaying process, to the money amount inputting screen definition table stored in the storage section (for example, hard disk) 9 of the automatic transaction apparatus 1 to access the server 3 based on the global information address included in the additional information screen addresses (reference information screen addresses) of the money amount inputting screen definition table.

In this instance, it is necessary to store, as the global information address, an address for acquiring the home banking access screen (refer to the upper side screen at step J10 of FIG. 13) including link information (home banking linking button) for accessing the home banking, different from the first embodiment described hereinabove.

Then, the additional information controlling section 8 requests the server 3 for transmission of the home banking access screen and then causes the additional information screen displaying section 12 to display the home banking access screen transmitted from the server 3 [step J10; paying out (withdrawal) money amount inputting screen-corresponding additional information screen (reference information screen) displaying step].

If, in this state, the user clicks the home banking linking button on the home banking access screen displayed on the additional information screen displaying section 12 in order to access the home banking, then the additional information controlling section 8 accesses a server 3', in which a Web page of the home banking is stored, to request the server 3' to transmit the Web page of the home banking.

Then, the additional information controlling section 8 causes the additional information screen displaying section 12 to display the Web page (refer to a lower side screen at step J20 of FIG. 13) of the home banking transmitted from the server 3' [step J20; paying out (withdrawal) money amount inputting screen-corresponding additional information screen (reference information screen) display step].

Thereafter, if the user selects, for example, the balance inquiry on the Web page of the home banking, then the additional information controlling section 8 issues a request for balance information to the home banking of the server 3' and causes the balance information transmitted from the home banking of the server 3' to be displayed.

It is to be noted that an upper side screen at step J30 of FIG. 13 illustrates a state wherein a screen representing that an inquiry (processing) to the home banking of the server 3' is proceeding with the additional information controlling section 8 in order to acquire the balance information is displayed [step J30; paying out (withdrawal) money amount inputting screen-corresponding additional information screen (reference information screen) displaying step].

Accordingly, with the automatic transaction apparatus according to the present embodiment, similar effects to those of the automatic transaction apparatus of the first embodiment are exhibited. Further, since a home banking transaction can be implemented on the automatic transaction apparatus 1, it is possible for a user who daily utilizes home banking to utilize the home banking familiar to the user on the automatic transaction apparatus 1, and the operability in acquisition of additional information (reference information) is improved. As a result, further reduction of the time required for transaction can be anticipated.

It is to be noted that, while the present second embodiment is configured such that the additional information controlling section 8 causes, in place of causing the additional information screen displaying section 12 to display the reference information transaction selection screen, the home banking access screen including the link information (link button) for accessing to the home banking to be displayed so that the home banking may be accessed, the measures for accessing the home banking are not limited to this.

For example, the reference information transaction selection screen (refer to the upper side screen at step A30 of FIG. 5) displayed on the additional information screen displaying section 12 in the first embodiment described hereinabove may include the link information (home banking linking button) for accessing the home banking described above such that the reference information transaction selection screen may function also as the home banking access screen. This makes it possible for the user to select whether or not the home banking should be accessed, and consequently, the operability is further improved.

Further, for example, the screens displayed on the additional information screen displaying section 12 in the first embodiment described above may include the link information (home banking linking button) for accessing the home banking described above so that the home banking may be accessed at each stage of a normal transaction.

Where a home banking transaction is implemented by the automatic transaction apparatus 1 as described above, the automatic transaction apparatus 1 functions as an information terminal, and the user can freely acquire information required by the user itself parallelly through the Internet 5 at any stage of a normal transaction (during a normal transaction operation).

In this instance, the additional information controlling section 8 and the additional information screen displaying section 12 have a function of acquiring information through the Internet 5 and therefore are referred to as information terminal sections.

[Others]

While, in the embodiments described above, reference information (additional information) corresponding to a normal transaction screen displayed on the normal transaction screen displaying section 11 is displayed on the additional information screen displaying section 12, the manner of displaying is not limited to this.

For example, when a normal transaction screen at each stage is displayed on the normal transaction screen displaying section 11, the additional information controlling section 8 may cause the additional information screen displaying section 12 (a predetermined region of the screen displaying section) to display an Internet connection screen including at least a portion for inputting a URL such that a user can input a URL through the Internet connection screen to access an arbitrary Web site on the Internet. In this instance, the automatic transaction apparatus 1 function as an information terminal, and the user can freely acquire information required by the user itself through the Internet parallelly at each stage of a normal transaction.

In this instance, since the additional information controlling section 8 and the additional information screen displaying section 12 have a function of acquiring information through the Internet 5, they are referred to as information terminal sections.

It is to be noted that all of the additional information screens displayed on the additional information screen displaying section 12 need not be made Internet connection screens in this manner, but it is necessary to change at least the reference information transaction selection screen (refer to the upper side screen at step A30 of FIG. 5) into an Internet connection screen.

Further, in the embodiments described, the reference information screens (additional information screens) displayed on the additional information screen displaying section 12 may include at least a portion for inputting a URL. This makes it possible for the user to select whether reference information should be acquired through a reference information screen displayed fixed or the Internet is accessed to freely acquire reference information, and the operability can be further improved. In this instance, a user who is not familiar with information acquisition from the Internet may use the reference information screen while another user who is familiar with information acquisition from the Internet may select the connection to the Internet.

[Description of the Screen Display Processing Program and a Computer-Readable Recording Medium in Which the Screen Display Processing Program is Stored]

Incidentally, while, in the embodiments described above, the automatic transaction apparatus 1 and the image displaying method for the automatic transaction apparatus 1 (hereinafter referred to as automatic transaction apparatus 1 and so forth) are described, a program (screen display processing program) for implementing such an automatic transaction apparatus 1 and so forth as just mentioned can be stored in a computer-readable storage medium and can be distributed, circulated on the market or sold or bought in a form wherein it is stored in a recording medium.

Since the automatic transaction apparatus 1 and so forth described hereinabove in connection with the embodiments can be implemented by installing the screen display processing program stored in such a recording medium as described above into the automatic transaction apparatus 1 (computer) and causing the automatic transaction apparatus 1 to execute the program, similar effects to those achieved by the automatic transaction apparatus 1 and so forth described hereinabove can be achieved by the screen display processing program stored in the recording medium.

The recording medium includes any recording medium which can record a program such as, for example, a memory such as a semiconductor memory, a magnetic disk, an optical disk (for example, a CD-ROM and so forth), a magneto-optical disk (MO), a magnetic tape, a hard disk, a flexible disk, an IC card, a ROM cartridge, a punched card, a storage device inside a computer (a memory such as a RAM and a ROM), an external storage device and so forth. Also it is possible to utilize various computer-readable media such as a printed matter on which a code such as a bar code is printed. It is to be noted that a CD-ROM, an MO, a magnetic tape, an IC card and so forth are also called portable recording media.

It is to be noted here that, while the screen display processing program is stored in a computer-readable recording medium, it may not necessarily be stored in a recording medium. Further, the screen display processing program may be transmitted (sent and received), for example, through the Internet (communication network) as a transmission medium without being stored in such a recording medium as mentioned above, and the screen display processing program can be distributed, circulated on the market or sold or bought through the transmission. For example, it is possible to upload the screen display processing program into a web server or the like and then download the screen display processing program, for example, from the web server through a network such as the Internet.

It is to be noted that the present invention is not limited to the embodiments described above but can be carried out in various modified forms without departing from the spirit and scope of the present invention.

INDUSTRIAL APPLICABILITY

As described above, according to the present invention, when a transaction such as, for example, a balance inquiry, a cash transaction such as money deposition or money withdrawal, a transfer, a passbook entry, or an inquiry for details of used money amounts or an available money amount is to be performed, a user can acquire information (reference information) to be referred to at a suitable point of time. Consequently, the operability of the automatic transaction apparatus is improved and an accurate and rapid transaction can be implemented. Therefore, it is considered that the availability of the automatic transaction apparatus is very high.

What is claimed is:

1. An automatic transaction apparatus, comprising:
    a customer operation display panel including a transaction screen displaying section for displaying a plurality of transaction screens each including necessary information for transactions in order and a reference information screen displaying section for displaying a plurality of reference information screens each including reference information except for the necessary information for transactions when the user operates said transaction screen displaying section to perform a transaction;
    a storage section storing data of the transaction screens, and a screen definition table on which a transaction screen address for accessing data of one of the transaction screens and a reference information screen address for accessing data of one of the reference information screens are arranged in association with each other;
    a transaction screen controller controlling changing the transaction screen by:
        referring to the screen definition table stored in said storage section,
        reading data of one of the transaction screens stored in said storage section using the transaction screen address being included in the screen definition table, and
        changing over the transaction screen to be displayed on said transaction screen displaying section; and
    a reference information screen controller independent of the transaction screen controller and controlling in an interlocking relationship with the controlling of changing the transaction screen by the transaction screen controller, changing of the reference information screen by:
        referring to the screen definition table stored in said storage section,
        acquiring data of one of the reference information screens using the reference information screen address included in the screen definition table, and
        changing the reference information screen to be displayed on said reference information screen displaying section
    wherein
        the transaction screen controller is in communication with a host computer through a first communication line and reads transaction screen related data to be displayed on said transaction screen displaying section, and
        the reference information screen controller is in communication with a server through a second communication line to be separate from the first communication line and acquires reference information screen related data to be displayed on said reference information screen displaying section.

2. The automatic transaction apparatus as claimed in claim 1, wherein, in an interlocking relationship with the control performed by said transaction screen controller, the control causing said transaction screen displaying section to display as the necessary information for a transaction a screen for urging the user to insert a card, and
    said reference information screen controller refers to the screen definition table stored in said storage section, and as the reference information except for the necessary information for the transaction, acquires an information screen regarding usable cards from the server through the second communication line using the reference information screen address being included in the screen definition table, and causes said reference information screen displaying section to display the acquired information screen.

3. The automatic transaction apparatus as claimed in claim 1, wherein, in an interlocking relationship with the control performed by said transaction screen controller, the control causing said transaction screen displaying section to display as the necessary information for a transaction a screen for urging the user to input a password, and
    said reference information screen controller refers to the screen definition table stored in said storage section, as the reference information except for the necessary information for the transaction, acquires a password search screen from the server through the second communication line using the reference information screen address being included in the screen definition table, and causes said reference information screen displaying section to display the acquired password search screen.

4. The automatic transaction apparatus as claimed in claim 3, wherein, said reference information screen controller transmits a keyword inputted through the password search screen displayed on said reference information screen displaying section to the server through the second communication line, acquires a password corresponding to the keyword from the server through the second communication line, and causes said reference information screen displaying section to display a screen including the acquired password.

5. The automatic transaction apparatus as claimed in claim 1, wherein, in an interlocking relationship with the control performed by said transaction screen controller, the control causing said transaction screen displaying section to display as the necessary information for a transaction a screen for urging the user to input an amount of money, and
    said reference information screen controller refers to the screen definition table stored in said storage section, as the reference information except for the necessary information for the transaction, acquires information necessary for determination of an amount of money from the server through the second communication line using the reference information screen address being included in the screen definition table, and causes said reference information screen displaying section to display a screen including the acquired information.

6. The automatic transaction apparatus as claimed in claim 5, wherein, said reference information screen controller transmits an instruction for acquiring any information from among balance information, transfer history information and paying out history information as information necessary for determination of an amount of money to the server through the second communication line, acquire any information from among balance information, transfer history information and paying out history information from the server through the second communication line, and causes said reference information screen displaying section to display a screen including the acquired information.

7. The automatic transaction apparatus as claimed in claim 1, wherein, in an interlocking relationship with the control performed by said transaction screen controller, the control causing said transaction screen displaying section to display as the necessary information for a transaction a screen, stored in advance in the storage section, for urging the user to input an amount of money again, and said reference information screen controller refers to the screen definition table stored in said storage section, as the reference information except for the necessary information for the transaction, acquires information including a paying out limit amount of money from the server through the second communication line using the reference information screen address being included in the screen definition table, and causes said reference information screen displaying section to display a screen including the acquired information.

8. The automatic transaction apparatus as claimed in claim 1, wherein, in said storage section data of a fixed information screen as the data of one of the reference information screens is stored;

where said reference information screen controller receives a response that the reference information screen cannot be acquired through the second communication line, said reference information screen controller refers to the screen definition table stored in said storage section, as the reference information except for the necessary information for the transaction, acquires the data of the fixed information screen stored in said storage section using the reference information screen address being included in the screen definition table, and causes said reference information screen displaying section to display the acquired fixed information screen.

9. The automatic transaction apparatus as claimed in claim 1, wherein, in said storage section data of a fixed information screen as the data of one of the reference information screens is stored;

when said reference information screen controller tries to acquire the data of one of the reference information screens through the second communication line, said reference information screen controller decides a line speed of the second communication line, and where said reference information screen controller decides that the line speed of the second communication line is lower than or equal to a predetermined speed, said reference information screen controller refers to the screen definition table stored in said storage section, as the reference information except for the necessary information for the transaction, acquires the data of the fixed information screen stored in said storage section using the reference information screen address being included in the screen definition table, and causes said reference information screen displaying section to temporarily display the acquired fixed information screen, and then, after the data of one of the reference information screens is acquired from the server through the second communication line, said reference information screen controller causes said reference information screen displaying section to display the acquired reference information screen in place of the fixed information screen.

10. The automatic transaction apparatus as claimed in claim 9, wherein, where said reference information screen controller decides that the line speed of the second communication line is not lower than or equal to the predetermined speed, said reference information screen controller refers to the screen definition table stored in said storage section, as the reference information except for the necessary information for the transaction, acquires the data of one of the plurality of reference information screens from the server through the second communication line using the reference information screen address being included in the screen definition table, and causes said reference information screen displaying section to display the acquired reference information screen.

11. An automatic transaction method, comprising:

providing a transaction information screen controller and a reference information screen controller independent of the transaction information screen controller, and respectively displaying, on screen areas, transaction information including necessary information about a transaction and corresponding reference information including reference information other than the necessary information for the transaction, when a user performs the transaction;

changing, by the transaction information screen controller, the displayed transaction information during each phase of the transaction based on a definition of the transaction stored in a table that corresponds to the transaction information; and changing, by the reference information screen controller, independently and in an interlocking relationship with the changing of the transaction screen by the transaction screen controller, the displayed corresponding reference information according to changes in the transaction information by acquiring reference information that corresponds to a definition of the reference information stored in the table, wherein the changing of the displayed transaction information comprises communicating by the transaction screen controller with a host computer through a first communication line and reading transaction screen related data to be displayed on the screen area, and the changing of the displayed corresponding reference information comprises communicating by the reference information screen controller with a server through a second communication line to be separate from the first communication line and acquires reference information screen related data to be displayed on the screen area.

* * * * *

UNITED STATES PATENT AND TRADEMARK OFFICE
CERTIFICATE OF CORRECTION

| | | |
|---|---|---|
| PATENT NO. | : 7,822,673 B2 | |
| APPLICATION NO. | : 11/006727 | |
| DATED | : October 26, 2010 | |
| INVENTOR(S) | : Kiyoshi Inamochi | |

It is certified that error appears in the above-identified patent and that said Letters Patent is hereby corrected as shown below:

Title page Column 2 item (57), (Abstract), Line 8 after "provided" insert -- . --.

Signed and Sealed this
Eleventh Day of January, 2011

David J. Kappos
*Director of the United States Patent and Trademark Office*